US008190283B2

(12) United States Patent
Inokawa et al.

(10) Patent No.: US 8,190,283 B2
(45) Date of Patent: May 29, 2012

(54) SERVER AND PROGRAM

(75) Inventors: Takumi Inokawa, Hokkaido (JP);
Noriaki Koyama, Iwate (JP)

(73) Assignee: Tokyo Electron Limited, Tokyo (JP)

( * ) Notice: Subject to any disclaimer, the term of this patent is extended or adjusted under 35 U.S.C. 154(b) by 837 days.

(21) Appl. No.: 12/299,530

(22) PCT Filed: Apr. 24, 2007

(86) PCT No.: PCT/JP2007/058786
§ 371 (c)(1),
(2), (4) Date: Nov. 4, 2008

(87) PCT Pub. No.: WO2007/129565
PCT Pub. Date: Nov. 15, 2007

(65) Prior Publication Data
US 2009/0138118 A1    May 28, 2009

(30) Foreign Application Priority Data

May 9, 2006    (JP) .................................. 2006-129728

(51) Int. Cl.
| G06F 19/00 | (2006.01) |
| G06F 7/00 | (2006.01) |
| G06F 17/00 | (2006.01) |
| G06F 3/00 | (2006.01) |
| G06F 3/048 | (2006.01) |

(52) U.S. Cl. ........ 700/108; 700/110; 700/121; 707/600; 707/609; 707/726; 707/800; 715/221; 715/234; 715/700; 715/790; 702/179; 702/185; 702/189

(58) Field of Classification Search .................. 715/221, 715/234, 513, 700, 790, 793, 804; 707/600, 707/609, 726, 800; 702/179, 185, 189; 700/108, 700/109, 110, 121
See application file for complete search history.

(56) References Cited

U.S. PATENT DOCUMENTS 5,257,206 A * 10/1993 Hanson ......................... 700/273
(Continued)

FOREIGN PATENT DOCUMENTS

JP        05-035745 A      2/1993
(Continued)

OTHER PUBLICATIONS

International Search Report for PCT/JP2007/058786, dated Jul. 4, 2007.

(Continued)

*Primary Examiner* — Albert Decady
*Assistant Examiner* — Darrin Dunn
(74) *Attorney, Agent, or Firm* — Pearne & Gordon LLP

(57) ABSTRACT

A server device includes: an abnormality information output unit for storing a plurality of measurement information, which is time sequential information related to information measured in a plurality of manufacturing apparatuses, having manufacturing apparatus identifiers and time information, and storing at least one set of abnormality information indicating an abnormality and one or more measurement information, and outputting one or more abnormality information; a chart composing unit for composing one or more charts from one or more measurement information in pair with one or more abnormality information corresponding to an abnormality information instruction when the instruction, which is an instruction for one or more abnormality information among the one or more abnormality information outputted by the abnormality information output unit, is received; and an output unit for outputting the one or more charts composed by the chart composing unit, so that abnormality analysis can be carried out easily and efficiently.

10 Claims, 13 Drawing Sheets

U.S. PATENT DOCUMENTS

| | | | | |
|---|---|---|---|---|
| 5,311,759 A | * | 5/1994 | Mangrulkar et al. | 72/11.6 |
| 6,442,445 B1 | * | 8/2002 | Bunkofske et al. | 700/108 |
| 6,727,106 B1 | * | 4/2004 | Ankutse et al. | 438/5 |
| 7,117,058 B2 | * | 10/2006 | Lin et al. | 700/108 |
| 7,254,513 B2 | * | 8/2007 | Lin et al. | 702/179 |
| 7,395,131 B2 | * | 7/2008 | Funk | 700/108 |
| 7,558,700 B2 | * | 7/2009 | Yamashita et al. | 702/183 |
| 7,636,608 B2 | * | 12/2009 | Funk et al. | 700/108 |
| 7,793,162 B2 | * | 9/2010 | Mock et al. | 714/47.1 |
| 7,849,400 B2 | * | 12/2010 | Ritter et al. | 715/234 |
| 2002/0034326 A1 | * | 3/2002 | Ishikawa et al. | 382/149 |
| 2002/0156549 A1 | | 10/2002 | Hayashi | |
| 2006/0036564 A1 | * | 2/2006 | Yan et al. | 707/1 |
| 2006/0075314 A1 | * | 4/2006 | Lin et al. | 714/100 |
| 2006/0106509 A1 | * | 5/2006 | Robb et al. | 701/29 |

FOREIGN PATENT DOCUMENTS

| | | |
|---|---|---|
| JP | 06-333791 A | 12/1994 |
| JP | 11-074185 A | 3/1999 |
| JP | 11-354395 | 12/1999 |
| JP | 2004-165282 A | 6/2004 |
| JP | 2005-142467 A | 6/2005 |
| JP | 2005-173911 A | 6/2005 |
| JP | 2005-182635 A | 7/2005 |
| JP | 2005-346655 A | 12/2005 |

OTHER PUBLICATIONS

Korean Office action for 10-2008-7025244 dated Aug. 11, 2010.
Taiwanese Office action for 096115618 dated Jul. 8, 2010.
Japanese Office action for 2006-129728 dated Apr. 26, 2011.

* cited by examiner

Fig. 8

| | MANUFACTURING APPARATUS IDENTIFIER | RECIPE IDENTIFIER | MEASURED VALUE | TIME INFORMATION |
|---|---|---|---|---|
| TEMPERATURE OF UPPER PART IN FURNACE | E1 | R5 | 258 | 2005/12/02 15:00:00 |
| | | | 260 | 2005/12/02 15:00:01 |
| | | | 260 | 2005/12/02 15:00:02 |
| | | | ⋮ | ⋮ |
| TEMPERATURE OF CENTER PART IN FURNACE | E1 | R5 | 301 | 2005/12/02 15:00:00 |
| | | | 301 | 2005/12/02 15:00:01 |
| | | | 302 | 2005/12/02 15:00:02 |
| | | | ⋮ | ⋮ |
| TEMPERATURE OF LOWER PART IN FURNACE | E1 | R5 | 315 | 2005/12/02 15:00:00 |
| | | | 315 | 2005/12/02 15:00:01 |
| | | | ⋮ | ⋮ |
| PRESSURE IN FURNACE | E2 | R3 | 502 | 2005/12/04 10:00:30 |
| | | | 504 | 2005/12/04 10:00:31 |
| | | | ⋮ | ⋮ |
| | ⋮ | ⋮ | ⋮ | ⋮ |

Fig. 9

| | MANUFACTURING APPARATUS IDENTIFIER | RECIPE IDENTIFIER | MEAN VALUE OF MEASURED VALUES | TIME INFORMATION |
|---|---|---|---|---|
| TEMPERATURE OF UPPER PART IN FURNACE | E1 | R5 | 259 | 2005/12/02 15:00:00 |
| | | | 259 | 2005/12/02 16:00:00 |
| | | | 258 | 2005/12/02 17:00:00 |
| | | | ⋮ | ⋮ |
| TEMPERATURE OF CENTER PART IN FURNACE | E1 | R5 | 301 | 2005/12/02 15:00:00 |
| | | | 302 | 2005/12/02 10:00:00 |
| | | | 302 | 2005/12/02 17:00:00 |
| | | | ⋮ | ⋮ |
| TEMPERATURE OF LOWER PART IN FURNACE | E1 | R5 | 315 | 2005/12/02 15:00:00 |
| | | | 314 | 2005/12/02 16:00:01 |
| | | | ⋮ | ⋮ |
| PRESSURE IN FURNACE | E2 | R3 | 503 | 2005/12/04 10:00:30 |
| | | | 503 | 2005/12/04 11:00:30 |
| | | | ⋮ | ⋮ |
| | ⋮ | ⋮ | ⋮ | ⋮ |

Fig. 10

| MANUFACTURING APPARATUS IDENTIFIER | RECIPE IDENTIFIER | MEAN VALUE OF MEASURED VALUES | TIME INFORMATION |
|---|---|---|---|
| E1 | R5 | 259 | 2005/12/02 15:00:00 |
| | | 259 | 2005/12/02 16:00:00 |
| | | 258 | 2005/12/02 17:00:00 |
| | | ⋮ | ⋮ |
| E2 | R3 | 503 | 2005/12/04 10:00:30 |
| | | 503 | 2005/12/04 11:00:30 |
| | | ⋮ | ⋮ |
| ⋮ | ⋮ | ⋮ | ⋮ |

Fig. 11

| TIME INFORMATION | APPARATUS IDENTIFIER | RECIPE IDENTIFIER | CHART NAME | CHART TYPE |
|---|---|---|---|---|
| 2005/12/02 15:00:00 | E1 | R5 | ¥ERR¥SPC1 | SPC |
| 2005/12/02 16:00:00 | E1 | R5 | ¥ERR¥SPC1 | SPC |
| 2005/12/02 17:00:00 | E1 | R5 | ¥ERR¥SPC1 | SPC |
| ⋮ | ⋮ | ⋮ | ⋮ | ⋮ |
| 2005/12/04 10:00:30 | E2 | R3 | ¥ERR¥SPC2 | SPC |
| 2005/12/04 11:00:30 | E2 | R3 | ¥ERR¥SPC2 | SPC |
| ⋮ | ⋮ | ⋮ | ⋮ | ⋮ |
| ⋮ | ⋮ | ⋮ | ⋮ | ⋮ |

*Fig. 13*

| ID | GROUP CHART INFORMATION | | |
| --- | --- | --- | --- |
| | RECIPE IDENTIFIER | MEASURED VALUE | CHART TYPE |
| 1 | R5 | TEMPERATURE OF UPPER PART IN FURNACE | SPC |
| | | TEMPERATURE OF CENTER PART IN FURNACE | SPC |
| | | TEMPERATURE OF LOWER PART IN FURNACE | SPC |
| 2 | R1 | TEMPERATURE IN FURNACE | SPC |
| | | TEMPERATURE IN FURNACE | CORRELATION |
| | | PRESSURE | |
| 3 | R2 | PRESSURE | CORRELATION |
| | | GAS FLOW RATE | |
| | | PRESSURE | CORRELATION |
| | | TEMPERATURE | |
| 4 | R3 | TEMPERATURE | SPC |
| | | TEMPERATURE | MD |
| | | PRESSURE | |
| | | GAS FLOW RATE | |
| ⋮ | ⋮ | ⋮ | ⋮ |

SERVER AND PROGRAM

TECHNICAL FIELD

The present invention relates to a group management system including a plurality of manufacturing apparatuses for performing a preset process on a target substrate; and a server device connected with the plurality of manufacturing apparatuses; and also relates to a server.

BACKGROUND ART

With regard to a conventional group management system, there has been realized a measurement information processing method capable of automatically and correctly processing data transmitted from a measuring device in a group management system of semiconductor manufacturing apparatuses (see, for example, Patent Document 1). In this measurement information processing method, a measuring device communication unit of a group managing unit of the group management system receives various kinds of measurement information transmitted from the measuring device. This measurement information processing method includes the steps of registering formulas for processing the measurement information in advance; upon receiving the measurement information, storing therein the received measurement information in a measurement information receiving buffer; selecting, among the registered formulas, one formula suitable for processing the measurement information and having at least one same recipe name as a recipe name of the measurement information and storing therein the selected formula in a formula storing buffer; applying the measurement information to the selected formula and performing a calculation; and storing therein a calculation result in a processed data storing buffer.

Further, the conventional group management system of semiconductor manufacturing apparatuses has a function of displaying time sequential information (hereinafter, referred to as a chart) measured by the semiconductor manufacturing apparatuses. On the chart, information of a plurality of semiconductor manufacturing apparatuses managed by the group management system is displayed. Furthermore, the conventional group management system has a function called FDC (Fault Detection and Classification) for performing an abnormality detection and an abnormality classification by using the chart.

[Patent Document 1] Japanese Patent Laid-open Publication No. H11-354395 (for example, Page 1 and FIG. 1)

DISCLOSURE OF THE INVENTION

Problems to be Solved

However, in the conventional group management system of semiconductor manufacturing apparatuses, when performing an analysis of an abnormality after detecting it, a user has to remember the detected abnormality data, and start a separate chart output application to output a chart, and then find out the abnormality data on the chart.

Further, when an abnormality is acknowledged in certain measurement information, there is a likelihood that other measurement information may also be related thereto. In such case, the user has to search for a chart containing the other related measurement information depending on the user's experience or intuition.

Means for Solving the Problems

The present invention is directed to a server device constituting a group management system, which includes a plurality of manufacturing apparatuses for performing a preset process on a target substrate and the server device connected with the plurality of manufacturing apparatuses and has a function of performing an abnormality analysis after detecting an abnormality, the server device including: a receiving unit for receiving an input including an instruction; a measurement information storage unit for storing therein a plurality of measurement information, which is time sequential information related to information measured in the plurality of manufacturing apparatuses, having manufacturing apparatus identifiers for identifying the manufacturing apparatuses and time information indicating time; an abnormality information storage unit for storing therein at least one set of abnormality information indicating an abnormality and one or more measurement information; an abnormality information output unit for outputting one or more abnormality information stored in the abnormality information storage unit; a chart composing unit for composing one or more charts from one or more measurement information in pair with one or more abnormality information corresponding to an abnormality information instruction when the receiving unit receives the abnormality information instruction, which is an instruction for one or more abnormality information among the one or more abnormality information outputted by the abnormality information output unit; and an output unit for outputting the one or more charts composed by the chart composing unit.

BEST MODE FOR CARRYING OUT THE INVENTION

Hereinafter, a server device and so forth in accordance with embodiments of the present invention will be described in detail with reference to the accompanying drawings. In the embodiments, elements assigned like reference numerals are operated in the same way, so that redundant description thereof may be omitted.

Embodiment

FIG. 1 provides a conceptual diagram of a group management system in accordance with an embodiment of the present invention. The group management system is a system for controlling manufacturing apparatuses such as a semiconductor manufacturing apparatus, a liquid crystal panel manufacturing apparatus or the like. Further, the group management system includes one or more manufacturing apparatuses 11 (from a manufacturing apparatus 11(1), a manufacturing apparatus 11(2), a manufacturing apparatus 11(3) to a manufacturing apparatus 11(*n*)), a server device 12 and a client device 13.

The manufacturing apparatus 11 is an apparatus for manufacturing a wafer. The manufacturing apparatus 11 performs various processes such as a film forming process, an etching process, a thermal oxidation process, and the like on a target substrate. The manufacturing apparatus 11 is, for example, a semiconductor wafer manufacturing apparatus of a multi-process type. Provided in FIG. 2 is an example of the semiconductor wafer manufacturing apparatus. As illustrated in FIG. 2, the semiconductor wafer manufacturing apparatus includes a plurality of, e.g., three process chambers 1, 2 and 3 for performing various processes such as a film forming process, an etching process, a thermal oxidation process and the like on a semiconductor wafer; cassette chambers 4 and 5 for accommodating cassettes C1 and C2 each for storing therein a number of wafers W (for example, 50 sheets of wafers); and a transfer chamber 6 for performing a transfer of the wafers W between the process chambers 1, 2 and 3 and the cassette chambers 4 and 5. The respective chambers are connected by gate valves G such that they can be opened or closed. The transfer chamber 6 has, e.g., a multi-joint transfer arm 7 capable of making an extending/retracting motion and a rotating motion, and the transfer of the wafer W is performed between the chambers by this transfer arm 7. While loaded into the cassette chambers 4 and 5, the cassettes C1 and C2 are turned by 90 degrees, and wafer loading/unloading openings of the cassettes C1 and C2 are rotated to face the center of the transfer chamber 6 so that loading/unloading of the wafer W by the transfer arm 7 is possible.

Further, the manufacturing apparatus 11 stores therein, for example, a recipe (typically, a set of process condition values), which is information upon a specific process for the wafer, and the manufacturing apparatus 11 is controlled by using the recipe.

Further, the server device 12 constitutes a so-called group management system, and it stores therein various measurement information obtained in the plurality of manufacturing apparatuses 11 and has a function of detecting an abnormality from the measurement information as well as a function of analyzing the abnormality, which will be described later.

Further, the client device 13 sends various requests to the server device 12, and receives processed results from the server device 12.

FIG. 3 presents a block diagram of the group management system in accordance with the embodiment of the present invention. The group management system includes the one or more manufacturing apparatuses 11, the server device 12, and the client device 13.

The manufacturing apparatus 11 includes an input receiving unit 1101, a recipe storage unit 1102, a manufacturing apparatus identifier storage unit 1103, a product wafer number storage unit 1104, a processing unit 1105, a measuring unit 1106, a raw information accumulation unit 1107, and a raw information transmitting unit 1108.

The server device 12 includes a receiving unit 1201, a measurement information storage unit 1202, an abnormality information storage unit 1203, a group chart information storage unit 1204, a raw information receiving unit 1205, a measurement information acquisition unit 1206, an abnormality detection unit 1207, a measurement information accumulation unit 1208, an abnormality information output unit 1209, a chart composing unit 1210, a related chart identification information acquisition unit 1211, a related chart composing unit 1212, and an output unit 1213.

The client device 13 includes an instruction input unit 1301, an instruction transmitting unit 1302, an output information receiving unit 1303, and a terminal output unit 1304.

The input receiving unit 1101 receives various inputs from a user of the manufacturing apparatus 11. The inputs can be a recipe, a recipe identifier for identifying the recipe, a manufacturing apparatus identifier for identifying the manufacturing apparatus, the number of product wafers, the total number of wafers including the number of dummy wafers, a wafer manufacture instructions (process execution instructions) or the like. The number of product wafers indicates the number of wafers to be manufactured as products and is counted without including the number of dummy wafers. Further, the number of wafers capable of being accommodated in the manufacturing apparatus 11 is, for example, 50 or 30, and the number of the dummy wafers among them is 10 or 5. Among the wafers capable of being accommodated, there is no specific restriction in the number of the dummy wafers and the number of the product wafers. An input unit for receiving various inputs from the user can be any of various types, such as a ten key, a keyboard, a mouse, a menu screen and the like. The input receiving unit 1101 can be implemented by a device driver of the input unit such as a ten key or a keyboard, or menu screen control software.

The recipe storage unit 1102 stores therein the recipe for use in controlling the manufacturing apparatus 11. The recipe is information upon a specific process for the target substrate and typically includes a set of process parameter information. The process parameter information includes, e.g., a category name, an item name, a parameter name and a value. The category name indicates the kind of a process parameter, and it can be, for example, 「temperature」, 「gas flow rate」, 「speed of boat elevator」 or the like. The item name indicates the property of the process parameter, and it can be, for example, 「speed of vertical movement」, 「speed of rotation」 or the like. The parameter name indicates the name of the process parameter, and it can be, for example, 「C」, 「A」 or the like. The value indicates a value assigned to a variable called the process parameter. Typically, the recipe is stored in a pair with a recipe identifier (e.g., recipe name) for identifying the recipe. Though the recipe storage unit 1102 is desirably a non-volatile storage medium, it can also be implemented by a volatile storage medium.

The manufacturing apparatus identifier storage unit 1103 stores therein a manufacturing apparatus identifier for identifying the manufacturing apparatus 11. The manufacturing apparatus identifier may be information received by the input receiving unit 1101 or information previously stored in the manufacturing apparatus. Though the manufacturing apparatus identifier storage unit 1103 is desirably a non-volatile storage medium such as a hard disk, a ROM (Read-Only Memory) or the like, but it can also be a volatile storage medium such as a RAM (Random Access Memory) or the like.

The product wafer number storage unit 1104 stores therein information indicating the number of the product wafers. Typically, the information indicating the number of the product wafers is a numerical value (e.g., 40), but it can also be a symbol corresponding to the numerical value. That is, the information indicating the number of the product wafers has the same meaning as the number of the product wafers. The number of the product wafers in the product wafer number storage unit 1104 is, for example, a numerical value received by the input receiving unit 1101. Further, the number of the product wafers in the product wafer number storage unit 1104 can also be, for example, information automatically obtained by a non-illustrated means. The non-illustrated means for obtaining the number of the product wafers is, for example, a means for calculating the number of the product wafers by detecting a color difference between surfaces of a product wafer and a dummy wafer through image processing. Typically, the surface of the product wafer has a different color from that of the dummy wafer. Alternatively, the non-illustrated means for obtaining the number of the product wafers can be, for example, a means for calculating the number of the product wafers by reading ID written on the product wafer through image processing. Besides the mentioned examples, the means for automatically obtaining the number of the product wafers can be implemented in any other ways. Though the product wafer number storage unit 1104 is desirably a non-volatile storage medium such as a hard disk, a ROM or the like, but it can also be a volatile storage medium such as a RAM or the like.

The processing unit 1105 reads a recipe of the recipe storage unit 1102 and performs a specific process on the wafer according to the recipe. Typically, the processing unit 1105 can be realized by an MPU, a memory or the like. The processing sequence of the processing unit 1105 is typically realized by software, which is stored in a storage medium such as a ROM. However, it is also possible to realize the processing sequence by using hardware (a dedicated circuit).

The measuring unit 1106 measures a temperature, a gas flow rate or a pressure within the manufacturing apparatus 11 and obtains raw information which becomes a basis of measurement information to be charted. The raw information is information such as a temperature measurement or the like. The raw information typically includes time information indicating measurement time. It is more desirable that the raw information includes a recipe identifier for identifying a recipe processed when the measuring unit 1106 measures the temperature or the like; measurement values; and time information indicating the measurement times. It is possible for the measuring unit 1106 to measure plural values such as a temperature and a gas flow rate, or temperatures at plural locations. That is, it is possible that the raw information include more than one kind of measurement values. The measuring unit 1106 can be realized by sensors such as one or more temperature sensors or one or more flow rate sensors.

The raw information accumulation unit 1107 accumulates the raw information obtained by the measuring unit 1106 in a non-illustrated storage medium. Typically, the raw information accumulation unit 1107 can be implemented by, e.g., an MPU and a memory. Typically, the processing sequence of the raw information accumulation unit 1107 is realized by software, which is stored in a storage medium such as a ROM. However, it is also possible to realize the processing sequence by using hardware (a dedicated circuit). Furthermore, though the non-illustrated storage medium is desirably a non-volatile storage medium, it can also be implemented by a volatile storage medium.

The raw information transmitting unit 1108 transmits the raw information accumulated by the raw information accumulation unit 1107 to the server device 12. Here, there is no specific limitation in implementing a trigger for the transmission of the raw information. Further, the raw information transmitted by the raw information transmitting unit 1108 includes one or more measurement values (e.g., a temperature and a gas flow rate), time information, and the like. Furthermore, it is more desirable that the raw information transmitted by the raw information transmitting unit 1108 includes a manufacturing apparatus identifier for identifying the manufacturing apparatus 11 or a recipe identifier for identifying a recipe. Further, the raw information transmitted by the raw information transmitting unit 1108 may include the number of product wafers, the total number of wafers or the like. That is, it is possible that the raw information accumulated by the raw information accumulation unit 1107 has a different structure or component from that of the raw information transmitted by the raw information transmitting unit 1108. Further, the raw information may include a single manufacturing apparatus identifier and/or a single recipe identifier for plural measurement values. The raw information transmitting unit 1108 can be realized by a wired or wireless communication means or the like. Furthermore, it may be possible that the raw information transmitting unit 1108 reads the number of the wafers from the product wafer number storage unit 1104 and adds it to the raw information prior to transmitting the raw information to the server device 12. Further, it is also possible that the raw information transmitting unit 1108 reads the recipe identifier or the manufacturing apparatus identifier from the recipe storage unit 1102 or the manufacturing apparatus identifier storage unit 1103 respectively and adds it to the raw information prior to transmitting the raw information to the server device 12. Furthermore, the process of composing the to-be-transmitted raw information can be carried out by the raw information accumulation unit 1107 instead of the raw information transmitting unit 1108. There is no specific limitation in transmission timing of information of a pair of one or more measurement values (e.g., a temperature and a gas flow rate) and time information, the number of the product wafers, the manufacturing apparatus identifier and the recipe identifier.

The receiving unit 1201 receives an input including various instructions. The various instructions include an abnormality list output instruction for outputting one or more abnormality information (typically, an abnormality list); an abnormality information instruction (an instruction for outputting a chart corresponding to the abnormality information) which is an instruction for at least one abnormality information among the one or more abnormality information; a related chart output instruction for outputting, after one or more charts are outputted, a chart related to the one or more outputted charts; a startup instruction for the server device 12, and the like. Furthermore, a chart output instruction such as the abnormality information instruction or the related chart output instruction may include information upon the type of the chart (e.g., an SPC chart, a correlation chart, an MD chart or the like). Further, it may be possible that the output instructions include information upon the type of to-be-charted data (i.e., measurement information such as a temperature, a gas flow rate, a pressure or the like). Further, it may be also possible that the output instructions include information upon the property of dots and/or lines constituting the chart. To be more specific, the property information may contain colors and types (shapes) of dots, colors and types of lines, and the like. Further, though the inputs including these instructions are usually received from the client device 13, they can also be received from a keyboard, a mouse or the like which is connected with the server device 12. The receiving unit 1201 is made up of, for example, a wireless or wired receiving means. An input means for inputting the instructions and the like can be implemented in various ways, and, for example, it can be a ten key, a keyboard, a mouse, a menu screen or the like. The receiving unit 1201 may be implemented by a device driver of the input means such as the ten key or the keyboard or by menu screen control software.

The measurement information storage unit 1202 can store therein a plurality of measurement information, which is time sequential information containing one or more kinds of information (e.g., a temperature or a pressure) measured in the plurality of manufacturing apparatuses 11, having device identifiers for identifying the manufacturing apparatuses 11 and time information. It is desirable that the measurement information includes a recipe identifier or property information (e.g., the number of product wafers, the total number of wafers or the like). The measurement information may be information acquired by performing a specific operation to a plurality of raw information, received by the raw information receiving unit 1205, by the measurement information acquisition unit 1206 or it may be the same information as the raw information. The measurement information in the measurement information storage unit 1202 is used to analyze an abnormality after the detection thereof. Though the measurement information storage unit 1202 is desirably a non-volatile storage medium, but it can also be implemented by a volatile storage medium. Further, the measurement information of the measurement information storage unit 1202 may be information accumulated by the measurement information accumulation unit 1208, information directly received from the manufacturing apparatuses 11 or information read from a non-illustrated storage medium.

The abnormality information storage unit 1203 can store at least one set of abnormality information indicating an abnormality and one or more measurement information. The abnormality information includes, for example, date information indicating measurement date and time, a manufacturing apparatus identifier, a recipe identifier, and measurement values of measurement information having the abnormality. Further, the abnormality information includes, for example, date information indicating measurement date and time, a manufacturing apparatus identifier, chart identification information, a chart type, a step identifier for identifying a step in which the abnormality occurs, information upon whether an alarm is set, and the like. In addition, the abnormality information may further include any information among information indicating the abnormality and information related to the abnormality. Further, the chart identification information refers to information for identifying a chart having a plurality of measurement information containing measurement values of the measurement information having the abnormality. The chart type is information indicating the type of the chart (e.g., an SPC chart, a correlation chart, an MD chart or the like). Though the abnormality information storage unit 1203 is desirably a non-volatile storage medium, it can also be implemented by a volatile storage medium.

The group chart information storage unit 1204 can store therein one or more group chart information including more than one chart identification information for identifying charts. The chart identification information may be, for example, a chart name (e.g., a chart file name including a folder name). The chart identification information may be, for example, a chart name and a chart type. The group chart information includes a plurality of chart identification information contributing to abnormality analysis. The plurality of chart identification information is identification information of correlated charts. The group chart information includes, for example, chart identification information for identifying a chart of an upper part temperature in a furnace of the manufacturing apparatus 11, a chart identification information for identifying a chart of a center part temperature of the same furnace, and a chart identification information for identifying a chart of a lower part temperature of the same furnace. Further, the group chart information includes, for example, chart identification information for identifying a chart of an inner temperature of the furnace of the manufacturing apparatus 11 and a chart identification information for identifying a chart of a gas flow rate in the inside of the same furnace. It is desirable that the charts corresponding to the plurality of chart identification information of the group chart information are all SPC charts. However, it is also possible that charts corresponding to the plurality of chart identification information of the group chart information are SPC charts and correlation charts, or SPC charts and MD charts. Furthermore, it is still possible that the charts corresponding to the plurality of chart identification information of the group chart information are correlation charts and MD charts, or all correlation charts, or all MD charts. That is, the charts corresponding to the plurality of chart identification information of the group chart information can be of any type. The charts corresponding to the plurality of chart identification information of the group chart information are desirably combinations of charts contributing to the abnormality analysis. Though the group chart information storage unit 1204 is desirably a non-volatile storage medium, it can also be implemented by a volatile storage.

The raw information receiving unit 1205 receives, from the plurality of manufacturing apparatuses 11, the raw information which is a basis of the plurality of measurement information. The raw information receiving unit 1205 can be implemented by a wireless or wired communication means or the like.

The measurement information acquisition unit 1206 acquires a plurality of measurement information by performing a specific operation to the plurality of raw information received by the raw information receiving unit 1205. The specific operation refers to an operation performed at a preset time interval to acquire, for example, a mean value, a maximum value, a minimum value, a standard deviation or a median of a multiplicity of values of the plurality of raw information. Further, the specific operation may be an operation performed to acquire, for example, a mean value, a maximum value, a minimum value, a standard deviation or a median of the multiplicity of values of the plurality of raw information in every preset steps within a recipe. The measurement information acquisition unit 1206 operates to, for example, read a calculation equation stored in advance, perform an operation by substituting the plurality of raw information for the calculation equation, and acquire the plurality of measurement information. The measurement information acquisition unit 1206 can be realized by, typically, an MPU and a memory. Typically, the processing sequence of the measurement information acquisition unit 1206 is implemented by software, which is stored in a storage medium such as a ROM or the like. Here, hardware (a dedicated circuit) may be also possible for the implementation.

The abnormality detection unit 1207 detects an abnormality from the measurement information acquired by the measurement information acquisition unit 1206. The abnormality detection unit 1207 stores therein threshold values (typically, a maximum value and a minimum value in a normal range) for indicating an abnormal or normal range of the measurement values (a temperature, a gas flow rate, a pressure or the like) contained in the measurement information, and determines whether the measurement values are normal or abnormal by comparing the threshold values with the measurement values of the measurement information. The measurement information, which serves as a unit of abnormality detection by the abnormality detection unit 1207, is measurement information containing same manufacturing apparatus identifiers and same recipe identifiers, and is a plurality of measurement information whose time sequential information is consecutive, and is a plurality of measurement information containing measurement values measured in a series of processes. Typically, the abnormality detection unit 1207 can be implemented by an MPU and a memory, or the like. Typically, the processing sequence of the abnormality detection unit 1207 is implemented by software, which is stored in a storage medium such as a ROM or the like. Here, hardware (a dedicated circuit) may be also possible for the implementation.

The measurement information accumulation unit 1208 accumulates, in the measurement information accumulation unit 1202, a series of measurement information including measurement information having the abnormality detected by the abnormality detection unit 1207. The measurement information accumulation unit 1208 may accumulate all the measurement information acquired by the measurement information acquisition unit 1206 in the measurement information storage unit 1202. Typically, the measurement information accumulation unit 1208 can be implemented by an MPU and a memory, or the like. Typically, the processing sequence of the measurement information accumulation unit 1208 is implemented by software, which is stored in a storage medium such as a ROM or the like. Here, hardware (a dedicated circuit) may be also possible for the implementation.

The abnormality information output unit 1209 outputs one or more abnormality information stored in the abnormality information storage unit 1203. Typically, the abnormality information output unit 1209 outputs one or more abnormality information as an abnormality list. The abnormality information output unit 1209 outputs the one or more abnormality information in the form of a list or a menu, though its output form may be implemented in any other ways. Here, the term "output" includes a display on a display device, a print by a printer, a transmission to an external device and an accumulation in a storage medium. The abnormality information output unit 1209 may or may not include an output device such as a display, a speaker or the like. The abnormality information output unit 1209 can be implemented by, e.g., driver software of the output device, or driver software of the output device and the output device.

The chart composing unit 1210 composes one or more charts from the one or more measurement information each in pair with one of the one or more abnormality information corresponding to an abnormality information instruction. The abnormality information instruction is received by the receiving unit 1201, and it is an instruction upon at least one abnormality information (one or more abnormality items) among the one or more abnormality information (typically, abnormality list) outputted by the abnormality information output unit 1209. Further, the abnormality information instruction is typically an instruction upon at least one abnormality item in the abnormality list. When the receiving unit 1201 receives the abnormality information instruction, the chart composing unit 1210 composes a chart in which the one or more measurement information in pair with the abnormality information corresponding to the abnormality information instruction is visually distinguished from the other measurement information, desirably. For example, the chart composing unit 1210 may compose a chart in which dots indicating the measurement values of the one or more measurement information in pair with the abnormality information have different colors from dots indicating measurement values of the other measurement information. For example, the chart may be composed by using red-colored dots for abnormal measurement values and black-colored dots for normal measurement values. Further, it is also possible to use triangle-shaped dots for the abnormal measurement values and circle-shaped dots for the normal measurement values. Besides the mentioned examples, the chart composing unit 1210 may compose a chart, in which dots indicating the abnormal measurement values and dots indicating the normal measurement values are visually distinguished from each other, in any other ways. Since a method of composing an SPC chart, a correlation chart and an MD chart when one or more measurement values are given is well-known in the art, a detailed description thereof will be omitted. Typically, the chart composing unit 1210 can be implemented by an MPU and a memory. Typically, the processing sequence of the chart composing unit 1210 is implemented by software which is stored in a storage medium such as a ROM or the like. Here, hardware (a dedicated circuit) may be also possible for the implementation.

When the receiving unit 1201 receives a related chart output instruction after one or more charts are outputted, a related chart identification information acquisition unit 1211 acquires, from group chart information including all chart identification information or any one chart identification information among one or more chart identification information for identifying the outputted one or more charts, one or more chart identification information except the one or more chart identification information for identifying the outputted one or more charts. The related chart identification information acquisition unit 1211 acquires the chart identification information of a chart related to the outputted chart. The outputted chart is a chart including an abnormal measurement value and the related chart is a chart helpful in analyzing the abnormality. The related chart output instruction is an instruction for outputting a related chart related to the outputted one or more charts. Typically, the related chart identification information acquisition unit 1211 can be implemented by an MPU and a memory. Further, the processing sequence of the related chart identification information acquisition unit 1211 may also be implemented by software which is stored in a storage medium such as a ROM or the like. Furthermore, hardware (a dedicated circuit) may also be possible for the realization.

The related chart composing unit 1212 composes one or more charts by acquiring one or more measurement information from the measurement information storage unit 1202 for each of one or more chart identification information acquired by the related chart identification information acquisition unit 1211. Though the chart composed by the related chart composing unit 1212 is desirably an SPC chart, it can also be a correlation chart, an MD chart or the like. Typically, as for algorithms for composing the chart, the related chart composing unit 1212 has the same algorithm as that of the chart composing unit 1210. Typically, the related chart composing unit 1212 can be implemented by an MPU and a memory. Further, the processing sequence of the related chart composing unit 1212 may also be implemented by software which is stored in a storage medium such as a ROM or the like. Furthermore, hardware (a dedicated circuit) may also be possible for the implementation.

The output unit 1213 outputs the one or more charts composed by the chart composing unit 1210. Further, the output unit 1213 outputs the one or more charts composed by the related chart composing unit 1212. When the output unit 1213 outputs the one or more charts composed by the related chart composing unit 1212 in case that the chart composing unit 1210 has already composed the chart and the output unit 1213 has outputted it, it is desirable that the output unit 1213 outputs the one or more charts composed by the related chart composing unit 1212 together with the already-outputted chart. Here, the term "output" includes a display on a display device, a print by a printer, a transmission to an external device and an accumulation in a storage medium. The output unit 1213 may or may not include the output device such as a display or the like. It is possible to realize the output unit 1213 by driver software of the output device or driver software of the output device together with the output device or the like.

The instruction input unit 1301 inputs various instructions. The various instructions include, for example, a startup instruction, an abnormality list output instruction, an abnormality information instruction, a related chart output instruction, and the like. A means for inputting the instructions can be a ten key, a keyboard, a mouse, a menu screen or the like, though not limited thereto. The instruction input unit 1301 can be implemented by the input means such as the ten key, the keyboard or the like, a device driver thereof, or menu screen control software.

The instruction transmitting unit 1302 transmits the instructions inputted by the instruction input unit 1301 to the server device 12. Here, the term "transmitting" typically means transmission by a communication means. The instruction transmitting unit 1302 can be implemented by a wired or wireless communication means or the like.

The output information receiving unit 1303 receives information from the server device 12. The received information is a processed result of the server device 12, for example, an abnormality list, a chart, or the like. Here, the term "receiving" typically means reception by a communication means. The output information receiving unit 1303 can be implemented by a wired or wireless communication means or the like.

The terminal output unit 1304 displays, on a display, the abnormality list, the chart or the like received by the output information receiving unit 1303. The terminal output unit 1304 may or may not include the display. It is possible to realize the terminal output unit 1304 by driver software of the display, driver software of the display together with the display, or the like.

Hereinafter, an operation of the group management system will be explained. First of all, an operation of the manufacturing apparatus 11 will be explained with reference to a flowchart shown in FIG. 4.

(Step S401) The processing unit 1105 reads a recipe from the recipe storage unit 1102.

(Step S402) The processing unit 1105 substitutes 1 for a counter i.

(Step S403) The processing unit 1105 determines whether or not $i^{th}$ process step exists in the recipe read at step S401. If the $i^{th}$ process step exists, the process proceeds to step S404; otherwise, the process proceeds to step S409.

(Step S404) The processing unit 1105 performs the $i^{th}$ process step.

(Step S405) The measuring unit 1106 performs one or more kinds of predetermined measurement (e.g., temperature and pressure) and acquires raw information (here, the raw information only includes one or more kinds of values, typically).

(Step S406) The measuring unit 1106 acquires time information from a non-illustrated clock and composes raw information by applying the time information to the measurement information.

(Step S407) The raw information accumulation unit 1107 accumulates the raw information obtained in step S406 in a non-illustrated memory temporarily.

(Step S408) The raw information transmitting unit 1108 transmits, to the server device 12, the raw information (a pair of the one or more kinds of values and the time information) accumulated temporarily in step S407. Further, the raw information transmitting unit 1108 retains therein information (e.g., an IP address of the sever device 12 and the like) necessary to communicate with the sever device 12.

(Step S409) The processing unit 1105 increments the counter i by 1 and the process returns to step S403.

(Step S410) The raw information transmitting unit 1108 reads the number of product wafers from the product wafer number storage unit 1104. Further, the raw information transmitting unit 1108 can acquire other property information as well.

(Step S411) The raw information transmitting unit 1108 reads a recipe identifier from the recipe storage unit 1102. The recipe identifier corresponds to the recipe read in step S401.

(Step S412) The raw information transmitting unit 1108 reads a manufacturing apparatus identifier from the manufacturing apparatus identifier storage unit 1103.

(Step S413) The raw information transmitting unit 1108 transmits the number of product wafers, the recipe identifier and the manufacturing apparatus identifier read in steps S410 to S412 to the server device 12. Further, the raw information transmitting unit 1108 retains therein information (e.g., the IP address of the server device 12 and the like) necessary to communicate with the server device 12.

Furthermore, in the flowchart of FIG. 4, it may be possible to transmit plural pairs of the one or more kinds of values and the time information contained in the transmitted raw information, the number of the product wafers, the recipe identifier and the manufacturing apparatus identifier all together to the server device 12.

Hereinafter, an operation of the sever device 12 will be explained with reference to flowcharts shown in FIGS. 5 and 6.

(Step S501) The receiving unit 1201 determines whether an instruction has been received. If so, the process goes to step S502; otherwise, the process proceeds to step S521.

(Step S502) The abnormality information output unit 1209 determines whether the instruction received in step S501 is an abnormality list output instruction. If so, the process goes to step S503 and if not, the process jumps to step S506. Further, if the abnormality list output instruction is received, an abnormality detection process to be described below has been completed.

(Step S503) The abnormality information output unit 1209 reads one or more abnormality information stored in the abnormality information storage unit 1203. Further, the abnormality information output unit 1209 may also read information predetermined to be outputted when an abnormality list is outputted besides the one or more abnormality information.

(Step S504) The abnormality information output unit 1209 composes an abnormality list by using the one or more abnormality information read during step S503 or the like.

(Step S505) The abnormality information output unit 1209 outputs the abnormality list composed during step S504. Here, the abnormality list is transmitted to the client device 13. The process returns to step S501.

(Step S506) The chart composing unit 1210 determines whether or not the instruction received during step S501 is an abnormality information instruction. If so, the process goes to step S507 and if not, the process jumps to step S511. Further, if the abnormality information instruction is received, the abnormality list output process has been finished here.

(Step S507) The chart composing unit 1210 acquires one or more abnormality information (abnormality information corresponding to an instructed item from the abnormality list) corresponding to abnormality information instructions. The one or more abnormality information is abnormality information belonging to the already-outputted abnormality list.

(Step S508) The chart composing unit 1210 acquires one or more measurement information paired with one or more abnormality information acquired during step S507. To be more specific, the chart composing unit 1210 obtains, from the abnormality information storage unit 1203, the one or more abnormality information acquired during step S507 and corresponding information upon one or more measurement information (e.g., a pointer to the measurement information in the measurement information storage unit 1202, the chart identification information or the like), and acquires the one or more measurement information from the measurement information storage unit 1202 by using the corresponding information.

(Step S509) The chart composing unit 1210 composes a chart by using the one or more measurement information acquired during step S508. The chart can be of any type such as an SPC chart, a correlation chart, an MD chart or the like.

(Step S510) The output unit 1213 outputs the one or more chart composed during step S509. The process returns to step S501.

(Step S511) The related chart identification information acquisition unit 1211 determines whether or not the instruction received during step S501 is a related chart output instruction. If so, the process goes to step S512 and if not, the process returns to step S501. Further, if the related chart output instruction is received, the process of the abnormality information instruction (output of the chart) has been finished here.

(Step S512) The related chart identification information acquisition unit 1211 substitutes 1 for the counter i.

(Step S513) The related chart identification information acquisition unit 1211 determines whether or not $i^{th}$ chart exists in the outputted chart. If so, the process goes to step S514 and if not, the process returns to step S501.

(Step S514) The related chart identification information acquisition unit 1211 acquires chart identification information from the outputted $i^{th}$ chart. Further, the chart identification information of the outputted chart is stored in a memory.

(Step S515) The related chart identification information acquisition unit 1211 searches group chart information containing the chart identification information acquired during step S514, from the group chart information storage unit 1204.

(Step S516) The related chart identification information acquisition unit 1211 determines whether or not the group chart information searched during step S515 has already been searched during a loop process performed from step S513 to step S520. If not, the process goes to step S517 and if so, the process jumps to step S520.

(Step S517) The related chart identification information acquisition unit 1211 acquires one or more chart identification information, except the chart identification information related to the already-outputted chart, from two or more chart identification information contained in the group chart information searched during step S515.

(Step S518) The related chart composing unit 1212 acquires one or more measurement information for every chart identification information from the measurement information storage unit 1202 by using the one or more chart identification information acquired by the related chart identification information acquisition unit 1211 during step S517, thereby composing one or more charts.

(Step S519) The output unit 1213 outputs the one or more charts composed in step S518 by synthesizing them. Here, the synthetic output means outputting the one or more charts by overlapping them on the already-outputted chart. By outputting the plurality of related charts, it is possible to carry out the abnormality analysis efficiently and promptly.

(Step S520) The related chart identification information acquisition unit 1211 increments the counter i by 1 and the process returns to step S513.

(Step S521) The abnormality detection unit 1207 performs the process of the abnormality detection. The abnormality detection process will be explained in detail with reference to the flowchart shown in FIG. 6. The process returns to step S501.

Further, in the flowchart shown in FIG. 5, the process is terminated by an interruption of a power-off or a process termination.

Further, in the flowchart shown in FIG. 5, though the related chart composing unit 1212 composed the one or more charts in response to the related chart output instruction, it can also be possible to compose one or more related charts previously, accumulate the one or more related charts and read and output the one or more accumulated charts when the related chart output instruction is received.

Hereinafter, the abnormality detection process of step S521 in accordance with the server device 12 will be explained with reference to the flowchart shown in FIG. 6.

(Step S601) The raw information receiving unit 1205 determines whether or not raw information including a pair of one or more kind of measurement values and time information is received. If so, the process goes to step S602 and if not, the process jumps to step S603.

(Step S602) The raw information receiving unit 1205 additionally records the raw information received during step S601 into a buffer. The process returns to step S501 of the flowchart shown in FIG. 5.

(Step S603) The raw information receiving unit 1205 determines whether or not information on the properties such as the number of product wafers or the manufacturing apparatus identifier is received. If so, the process goes to step S604 and if not, the process returns to step S501 of the flowchart shown in FIG. 5.

(Step S604) The raw information receiving unit 1205 adds the information on the properties such as the number of the product wafers to the already-received pair of one or more measurement values and time information. Here, the raw information which is a basis of the measurement information is composed.

(Step S605) The measurement information acquisition unit 1206 acquires one or more measurement information by performing a specific operation to the one or more measurement values (temperature, pressure or the like) contained in the raw information composed during step S604.

(Step S606) The abnormality detection unit 1207 acquires abnormality information by performing the abnormality detection to the one or more measurement information acquired during step S605. Here, the abnormality information includes, for example, date information indicating measurement date and time, a manufacturing apparatus identifier, chart identification information for identifying a chart inclusive of a plurality of measurement information containing measurement values of measurement information having an abnormality, a chart type for indicating the kind of the chart (an SPC chart, a correlation chart, an MD chart or the like), a step identifier for identifying a step in which the abnormality occurs, information on whether or not an alarm is set, or the like. When the abnormality information includes a chart, the chart composing unit 1210 composes a chart by using a series of the measurement information containing the measurement values having the abnormality and accumulates the chart after the abnormality is detected by the abnormality detection unit 1207.

(Step S607) The abnormality detection unit 1207 accumulates the abnormality information acquired during step S606 in the abnormality information storage unit 1203.

(Step S608) The measurement information accumulation unit 1208 accumulates a series of the measurement information containing the measurement information, which is related to the abnormality detected by the abnormality detection unit 1207, in the measurement information storage unit 1202. The process returns to step S501 of the flowchart shown in FIG. 5.

Further, in the flowchart shown in FIG. 6, it is possible that the raw information is the same as the measurement information. In this case, the process of reading the raw information is carried out in step S605.

Further, in the flowchart shown in FIG. 6, upon finishing the receipt of the raw information, the abnormality detection began. However, there is no limitation in timing for detecting the abnormality. It may be possible to begin the abnormality detection in response to the instruction of a user (the client device 13). Further, in this case, it is possible for the user to input the manufacturing apparatus identifier or the recipe identifier if the user can guess which manufacturing apparatus 11 or the recipe has the abnormality therein. Further, in this case, the abnormality detection instruction includes the inputted identifier of the manufacturing apparatus and the recipe identifier. Furthermore, it is desirable to detect the abnormality in the measurement information corresponding to the manufacturing apparatus identifier and the recipe identifier included in the abnormality detection instruction.

In addition, in the flowcharts shown in FIGS. 5 and 6, there is no limitation in the timing for composing the chart. It is possible to compose the chart when the chart output instruction is received and it is also possible to compose the chart having a possibility of being outputted in advance and to accumulate it.

Hereinafter, the operation of the client device 13 will be explained. When the instruction input unit 1301 of the client device 13 receives various instructions from the user, the instruction transmitting unit 1302 transmits the various instructions to the server device 12, and the output information receiving unit 1303 receives processed results from the server device 12, and then the terminal output unit 1304 displays the received information.

Hereinafter, a detailed operation of the group management system in accordance with the present embodiment will be explained. FIG. 1 provides a conceptual diagram of the group management system.

In this example, when the input receiving unit 1101 of each of the plurality of the manufacturing apparatuses 11 receives a startup instruction for manufacturing a wafer or the like from the user, the processing unit 1105 reads a recipe from the recipe storage unit 1102 and performs a manufacturing process by executing the read recipe. Further, during the manufacturing process, the measuring unit 1106 measures the temperature of an upper part within a predetermined furnace at an interval of, e.g., one second by using, for example, a first temperature sensor, and the raw information transmitting unit 1108 transmits a pair of the measured temperature and time information acquired by a non-illustrated clock to the server device 12 at an interval of, e.g., one second. An example of the transmitted raw information is shown in FIG. 7. Here, the raw information includes the temperature and the time information. Further, the time information is information indicating time, and it may include hour, minute and second or just include date and hour. Likewise the measuring unit 1106 measures the temperature of a center part within the predetermined furnace at an interval of, e.g., one second by using a second temperature sensor during the manufacturing process, and the raw information transmitting unit 1108 transmits, to the server device 12, the measured temperature in pair with time information acquired from the non-illustrated clock at an interval of, e.g., one second. Likewise, the measuring unit 1106 measures the temperature of a lower part within the predetermined furnace at an interval of, e.g., one second by using, for example, a third temperature sensor during the manufacturing process, and the raw information transmitting unit 1108 transmits the measured temperature in pair with time information acquired from the non-illustrated clock to the server device 12 at an interval of, e.g., one second.

Furthermore, upon the completion of all the steps of the recipe, the raw information transmitting unit 1108 of the manufacturing apparatus 11 reads the manufacturing apparatus identifiers in the manufacturing apparatus identifier storage unit 1103, the recipe identifiers (the identifiers of the recipes executed during the manufacture of the wafer) in the recipe storage unit 1102 and the number of product wafer in the product wafer number storage unit 1104 and obtains other property information (the total number of wafers, or the like) and transmits them to the server device 12.

Thereafter, the raw information receiving unit 1205 of the server device 12 receives, at an interval of, e.g., one second, information of a pair of a temperature of the upper part in the furnace and time information, a pair of a temperature of the center part in the furnace and time information, a pair of a temperature of the lower part in the furnace and time information, a pair of a gas flow rate in the furnace and time information, a pair of a pressure in the furnace and time information and so forth in sequence, and then accumulates them temporarily. Further, it receives the manufacturing apparatus identifiers, the recipe identifiers, the number of product wafers, and so forth. Further, the raw information receiving unit 1205 stores the raw information containing the plural sets of temperature of the upper part in the furnace and time information, the recipe identifiers and the manufacturing apparatus identifiers in a memory temporarily. An example of the raw information is shown in FIG. 8. FIG. 8 provides a raw information management table. The raw information management table includes 「manufacturing apparatus identifiers」, 「recipe identifiers」, 「measurement values」 and 「time information」. The 「measurement values」 include the temperatures of the upper part, the center part and the lower part in the furnace, the pressure in the furnace, the gas flow rate in the furnace and the like. FIG. 8 shows a data structure in which a plurality of values (here, only one kind of values) and time information correspond to a single manufacturing apparatus identifier and a single recipe identifier. Further, FIG. 8 illustrates raw information with regard to the execution of the plurality of manufacturing apparatuses 11 (E1, E2, and so forth) and the plurality of recipes (R5, R3, and so forth) are managed.

Subsequently, the measurement information acquisition unit 1206 acquires a plurality of raw information for each of a series of measurement values of the same manufacturing apparatus identifier, the same recipe identifier and the same kind (e.g., the temperature of the upper part in the furnace), and acquires a plurality of measurement information by performing a specific operation to the plurality of raw information. Here, the specific operation is an operation to calculate a mean value, and the measurement information acquisition unit 1206 calculates the mean value every hour. Further, the measurement information acquisition unit 1206 acquires a measurement information management table shown in FIG. 9 from the raw information management table shown in FIG. 8.

Thereafter, the abnormality detection unit 1207 acquires abnormality information by performing abnormality detection on one or more measurement information of the measurement information management table shown in FIG. 9. Here, the abnormality detection unit 1207 stores therein a threshold condition of 「300<=temperature<=400」 for determining normality/abnormality, which is applicable to detection for any of the upper part, the center part and the lower part in the furnace. That is, to be detected as normal, all the temperatures in the furnace need to be in the range of 300 degrees to 400 degrees.

In such case, the abnormality detection unit 1207 reads the stored threshold condition of 「300<=temperature<=400」. Subsequently, the abnormality detection unit 1207 reads the mean values of the measurement values of FIG. 9 and acquires information (record) which do not satisfy the condition of 「300<=temperature<=400」 among the mean values of the measured temperature values. Further, the abnormality detection unit 1207 detects that the temperature of the upper part in the furnace falls out of a normal range defined by the above condition during a process identified by a manufacturing apparatus identifier ⌈E1⌋ and a recipe identifier ⌈R5⌋.

Further, the abnormality detection unit 1207 continues detecting other abnormal values from the mean values of the measurement values shown in FIG. 9. Then, the abnormality detection unit 1207 accumulates measurement information including all the detected measurement values in the measurement information storage unit 1202. The measurement information accumulated in the measurement information storage unit 1202 includes measurement information containing measurement values having an abnormality and measurement information in series with that measurement information. FIG. 10 shows the measurement information.

Thereafter, the chart composing unit 1210 composes a chart by using the measurement information having the abnormality detected and accumulated by the abnormality detection unit 1207. Typically, the chart is an SPC chart using a single variable. Further, here, the chart composing unit 1210 automatically generates a file name to be assigned to the composed chart (e.g., generates a file name ⌈SPC?⌋ by incrementing the variable ⌈?⌋ by 1) and writes the composed chart in a file (e.g., ⌈SPC1⌋) in a predetermined folder (e.g., ⌈¥ERR⌋). Prior to writing the chart, the file needs to be created and opened.

Subsequently, the abnormality detection unit 1207 composes abnormality information from the abnormal measurement values (it may be possible to use the measurement information accumulated in the measurement information storage unit 1202), and accumulates the abnormality information in the abnormality information storage unit 1203. The abnormality detection unit 1207 detects all of the abnormal measurement values, composes the abnormality information corresponding to the abnormal measurement values, and accumulates it in the abnormality information storage unit 1203. FIG. 11 illustrates an abnormality information management table for managing such abnormality information. The abnormality information management table has ⌈time information⌋, ⌈apparatus identifier⌋, ⌈recipe identifier⌋, ⌈chart name⌋ and ⌈chart type⌋. The ⌈time information⌋ indicates the time when an abnormality is detected; the ⌈apparatus identifier⌋ indicates an identifier of an apparatus in which the abnormality is detected; and the ⌈recipe identifier⌋ indicates an identifier of a recipe which is executed when the abnormality is detected. In this embodiment, the ⌈chart name⌋ is ⌈¥ERR¥SPC?⌋ and the ⌈chart type⌋ is ⌈SPC⌋. In FIG. 10, ⌈¥ERR¥SPC1⌋ and ⌈¥ERR¥SPC2⌋ indicate that charts having the file names of ⌈SPC1⌋ and ⌈SPC2⌋ are composed and accumulated in the folder named ⌈¥ERR⌋.

Under this circumstance, the user inputs ⌈abnormality list output instruction⌋ through the client device 13. Further, the instruction input unit 1301 receives the ⌈abnormality list output instruction⌋ and the instruction transmitting unit 1302 transmits the instruction to the server device 12.

Then, the receiving unit 1201 of the server device 12 receives the ⌈abnormality list output instruction⌋. Further, the abnormality information output unit 1209 reads the abnormality information of FIG. 11 from the abnormality information storage unit 1203.

Thereafter, the abnormality information output unit 1209 composes an abnormality list by using the abnormality information. Further, the abnormality information output unit 1209 transmits the abnormality list to the client device 13, and the output information receiving unit 1303 of the client device 13 receives the abnormality list. Further, the terminal output unit 1304 outputs the abnormality list as shown in FIG. 12.

Further, in this detailed example, the group chart information storage unit 1204 stores therein a group chart information management table as shown in FIG. 13. A record corresponding to each ID in the group chart information management table includes chart identification information of two or more related charts. The group chart information management table shown in FIG. 13 includes one or more records each containing ⌈ID⌋ and ⌈group chart information⌋. Here, the ⌈ID⌋ indicates information for identifying a record and is necessary for managing the records in the table. Here, the ⌈group chart information⌋ includes ⌈recipe identifier⌋, ⌈measurement value⌋ and ⌈chart type⌋. The ⌈recipe identifier⌋ is information for identifying a recipe. The ⌈measurement value⌋ indicates information for specifying a data type and a measurement location of measurement data. The ⌈chart type⌋ indicates the type of an outputted chart. The group chart information is information containing accumulated know-how of abnormality analysis in the manufacturing field.

Under this circumstance, the user presses a button of ⌈chart output⌋ when the second item of the abnormality information in FIG. 2 is focused. In response thereto, the instruction input unit 1301 of the client device 13 receives an abnormality information instruction corresponding to the second item of the abnormality information. The abnormality information instruction contains time information ⌈2005/12/02 16:00:00⌋, the manufacturing apparatus identifier ⌈E1⌋, the recipe identifier ⌈R5⌋ and the chart name ⌈¥ERR¥SPC1⌋. Thereafter, the instruction transmitting unit 1302 transmits the abnormality information instruction to the server device 12.

Subsequently, the receiving unit 1201 receives the abnormality information instruction. Further, the chart composing unit 1210 reads a chart corresponding to the chart name ⌈¥ERR¥SPC1⌋ and by using the time information ⌈2005/12/02 16:00:00⌋, it composes a chart in which a dot corresponding to this time is focused.

Further, the output unit 1213 outputs the chart. Further, the output information receiving unit 1303 of the client device 13 receives the chart and the terminal output unit 1304 displays the chart as shown in FIG. 14. Further, here, it is assumed that the chart corresponding to the chart name ⌈¥ERR¥SPC1⌋ has already been composed and accumulated by the chart composing unit 1210. In FIG. 13, since the temperature ranging from 300 degrees to 400 degrees is within a normal range, the measurement values on the outputted chart are abnormal values. Further, a dot for an abnormal value is marked by ⌈×⌋.

Then, the user presses a button 「related chart output」on the screen of the client device 13 shown in FIG. 14.

Then, the instruction input unit 1301 of the client device 13 receives a related chart output instruction, and the instruction transmitting unit 1302 transmits the related chart output instruction to the server device 12.

Thereafter, the receiving unit 1201 of the server device 12 receives the related chart output instruction. Further, the related chart identification information acquisition unit 1211 acquires chart identification information in the outputted chart. Here, the chart identification information in the outputted chart includes the manufacturing apparatus identifier 「E1」, the recipe identifier 「R5」, the chart name 「¥ERR¥SPC1」and the measurement value 「temperature of the upper part in the furnace」.

Subsequently, the related chart identification information acquisition unit 1211 searches the group chart information management table in the group chart information storage unit 1204 by using the acquired chart identification information as a key. Here, since the record of 「ID=1」in the group chart information management table is matched thereto, the related chart identification information acquisition unit 1211 acquires two chart identification information: one indicates the recipe identifier 「R5」, the measurement value 「temperature of the center part in the furnace」and the chart type 「SPC」; and the other indicates the recipe identifier 「R5」, the measurement value 「temperature of the lower part in the furnace」and the chart type 「SPC」.

Then, the related chart composing unit 1212 obtains measurement information corresponding to the chart identification information indicating the recipe identifier 「R5」, the measurement value 「temperature of the center part in the furnace」and the chart type 「R5」from the measurement information management table shown in FIG. 9. Further, the related chart composing unit 1212 composes an SPC chart by using a plurality of acquired measurement information. Then, the output unit 1213 outputs the composed chart in an overlapping manner.

Further, the related chart composing unit 1212 obtains measurement information for composing a next chart and corresponding to chart identification information indicating the recipe identifier 「R5」, the measurement value 「temperature of the lower part in the furnace」and the chart type 「R5」from the measurement information management table shown in FIG. 9. Further, the related chart composing unit 1212 composes an SPC chart by using a plurality of acquired measurement information. Then, the output unit 1213 outputs the composed chart in an overlapping manner.

Then, the output information receiving unit 1303 of the client device 13 receives the charts outputted by the output unit 1213. Further, the terminal output unit 1304 obtains three SPC charts shown in FIG. 15. These three SPC charts include the chart of the temperature of the upper part in the furnace, the chart of the temperature of the center part in the furnace and the chart of the temperature of the lower part in the furnace. As can be seen from FIG. 15, abnormality is detected in the SPC chart of the temperature of the upper part in the furnace. Further, it can be found that the temperatures of the center part and the lower part in the furnace are quite low even though they are in the normal range. In view of this, it can be concluded that there is a need to raise the temperature.

As stated above, in accordance with the embodiment, it is possible to easily and efficiently perform an abnormality analysis. To be specific, a chart can be immediately outputted just by selecting an abnormal item from an abnormality list provided after a detection of an abnormality. Therefore, it is possible to easily and efficiently carry out the abnormality analysis after the abnormality detection.

Further, in accordance with the embodiment, in the state the chart of measurement values having the abnormality is outputted, it is possible to view other related charts very easily. Therefore, the abnormality analysis can be carried out very easily and efficiently. Moreover, by registering the related charts and using them when necessary, know-how of the abnormality analysis can be utilized efficiently.

Further, in the example of the present embodiment, though the chart is mainly explained as an SPC chart (e.g., see FIG. 15 or FIG. 16), it may be desirable to use a correlation chart (see FIG. 17) or an MD chart (see FIG. 18) depending on a target object of the abnormality analysis. Further, records of 「ID=2, 4」in the group chart information management table shown in FIG. 13 indicate that as a chart related to an SPC chart, there can be a correlation chart or an MD chart as well as the SPC chart. Further, the record of 「ID=3」in the group chart information management table shown in FIG. 13 indicates that there can be a correlation chart or an MD chart as a chart related to a correlation chart.

Further, in the present embodiment, when the button 「related chart output」is pressed on the screen of the abnormality list shown in FIG. 12, the server device 12 may output three charts shown in FIG. 15. This process can be carried out by outputting a chart corresponding to a focused abnormal item and two charts related to that chart. This process can be performed by omitting the above-described user interaction. In such case, the server device includes the following configuration. That is, the server device constitutes a group management system including a plurality of manufacturing apparatuses for performing a preset process on a target substrate and the server device connected with the plurality of manufacturing apparatuses and having a function of performing an abnormality analysis after detecting an abnormality. The server device includes: a receiving unit for receiving inputs including various instructions; a measurement information storage unit for storing therein a plurality of measurement information, which is time sequential information measured in the plurality of manufacturing apparatuses, having manufacturing apparatus identifiers for identifying the manufacturing apparatuses and time information indicating time; an abnormality information storage unit for storing therein at least one set of abnormality information indicating an abnormality and one or more measurement information; an abnormality information output unit for outputting one or more abnormality information stored in the abnormality information storage unit; a group chart information storage unit for storing therein one or more group chart information including more than one chart identification information for identifying a chart; a related chart identification information acquisition unit, when the receiving unit receives an abnormality information instruction, which is an instruction for one or more abnormality information among the one or more abnormality information outputted by the abnormality information output unit, for acquiring related chart identification information including any one among one or more chart identification information for identifying a chart corresponding to one or more measurement information in pair with one or more abnormality information corresponding to the abnormality information instruction; a related chart composing unit for composing one or more charts by acquiring one or more measurement information from the measurement information storage unit for each of the one or more chart identification information acquired by the related chart identification information acquisition unit; an output unit for outputting the one or more charts composed by the related chart composing unit.

Further, the process in accordance with the present embodiment can be realized by software. Further, this software can be distributed in a way of software download or the like. Further, it is possible to record this software in the storage medium such as a CD-ROM and to distribute it. Further, the software for implementing the server device in the embodiment is a program as follows. That is, the program is executed in a server device constituting a group management system including a plurality of manufacturing apparatuses for performing a preset process on a target substrate and the server device connected with the plurality of manufacturing apparatuses and having a function of performing an abnormality analysis after detecting an abnormality. The program stores therein a plurality of measurement information, which is time sequential information measured in the plurality of manufacturing apparatuses, having manufacturing apparatus identifiers for identifying the manufacturing apparatuses and time information indicating time, and at least one set of abnormality information indicating an abnormality and one or more measurement information, and the program executes on a computer: a receiving step for receiving inputs including various instructions; an abnormality information output step for outputting the stored one or more abnormality information; a chart composing step for composing one or more charts from one or more measurement information in pair with one or more abnormality information corresponding to an abnormality information instruction when the abnormality information instruction is received in the receiving step, the abnormality information instruction being an instruction for one or more abnormality information among the one or more abnormality information outputted in the abnormality information output step; and an output step for outputting the one or more chart composed in the chart composing step.

Further, it is desirable that the program further executes on the computer: a related chart identification information acquiring step for acquiring, from group chart information including all chart identification information or any one chart identification information among one or more chart identification information for identifying the outputted one or more charts, one or more chart identification information except the one or more chart identification information for identifying the outputted one or more chart, when a related chart output instruction for outputting a chart related to the outputted one or more charts is received in the receiving step after the one or more charts are outputted; and a related chart composing step for composing one or more charts by acquiring one or more measurement information for each of the one or more chart identification information acquired in the related chart identification information acquiring step, wherein the one or more charts composed in the related chart composing step is also outputted in the output step.

Further, in the above-mentioned program, it is desirable that a chart, in which the one or more measurement information in pair with the abnormality information corresponding to the abnormality information instruction is visually distinguished from the other measurement information, is composed in the chart composing step.

Further, in the above-mentioned program, it is desirable to compose an SPC chart plotting the one or more measurement information during the chart composing step and/or during the related chart composing step.

Further, in the above-described program, the one or more measurement information include two kinds of the measurement values and it is desirable to compose a correlation chart showing a correlation between the two kinds of measurement values during the chart composing step and/or during the related chart composing step.

Further, in the above-described program, the one or more measurement information include three or more kinds of the measurement values and it is desirable to compose an MD chart for showing a correlation between the three or more kinds of measurement values during the chart composing step and/or during the related chart composing step.

Further, in accordance with each embodiment, it is possible to perform each process (each function) through centralized processing by a single device (system), or through distributed processing by a plurality of apparatuses.

Further, in an information transmitting step or an information receiving step, a process executed by hardware, for example, a process executed by a modem, an interface card or the like (a process executed only by hardware) during the transmitting step is not included in the above-mentioned program.

Further, one or more computers can be used to execute the program. That is, centralized processing or distributed processing can be performed.

Further, in each embodiment, two or more communication means in a single apparatus (the raw information receiving unit and the like) can be implemented physically by a single means.

The present invention is not limited to the above-mentioned embodiments and can be modified in various ways, and it shall be understood that all the modifications are included in the scope of the present invention.

The disclosure including the specification, drawings and claims of Japanese Patent Application Ser. No. 2006-129728, filed on May 9, 2006, are hereby incorporated by reference in its entirety in the present disclosure.

INDUSTRIAL AVAILABILITY

As stated above, the group management system in accordance with the present invention is capable of performing an abnormality analysis easily and efficiently, and includes a plurality of manufacturing apparatuses for performing a specific process on a target substrate and a server device connected to the plurality of the manufacturing apparatuses. Thus, it is advantageous that a group management system has a function of performing an abnormality analysis after detecting an abnormality.

BRIEF DESCRIPTION OF THE DRAWINGS

FIG. 8 offers a raw information management table in accordance with the embodiment of the present invention;

FIG. 9 offers a measurement information management table in accordance with the embodiment of the present invention;

FIG. 10 provides an example of measurement information containing abnormal measurement values in accordance with the embodiment of the present invention;

FIG. 11 offers an abnormality information management table in accordance with the embodiment of the present invention;

FIG. 13 offers a group chart information management table in accordance with the embodiment of the present invention;

Figure 1:
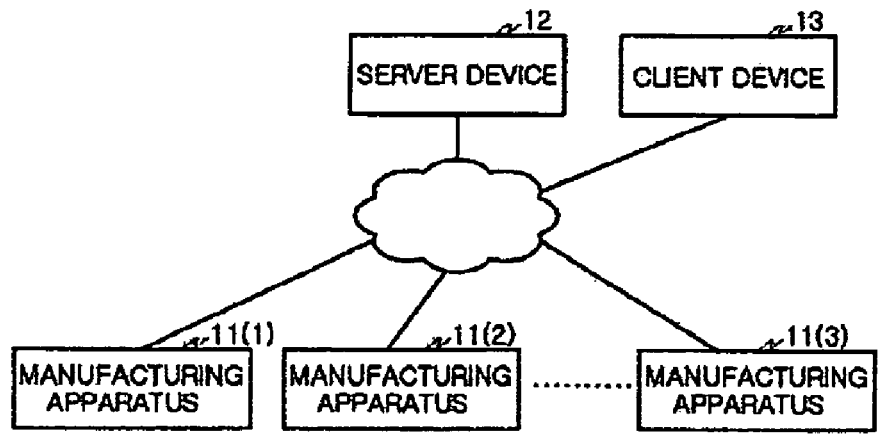
FIG. 1 provides a conceptual diagram of a group management system in accordance with an embodiment of the present invention.
Figure 2:
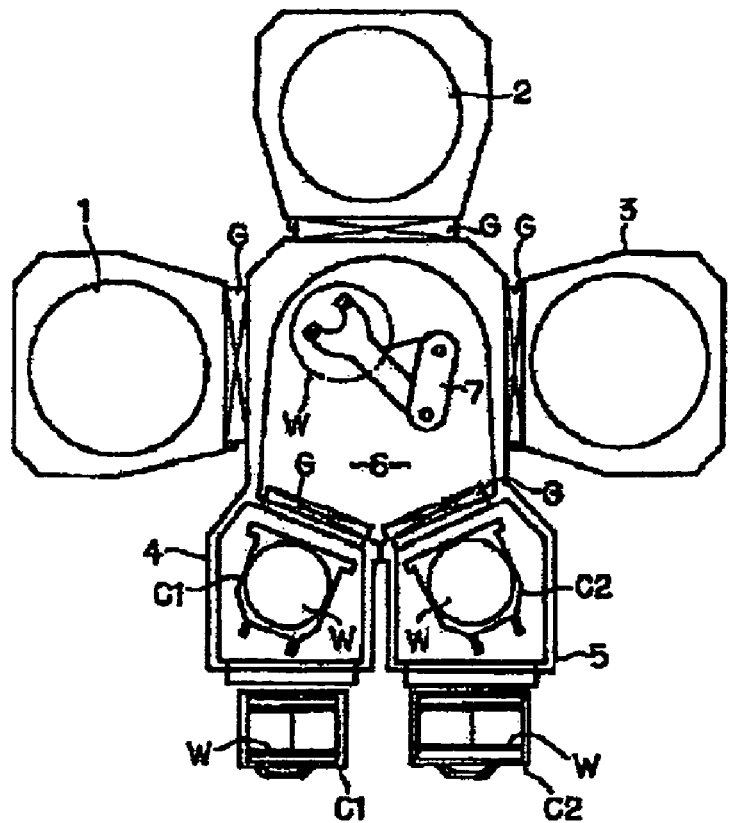
FIG. 2 provides an example of a semiconductor wafer manufacturing apparatus in accordance with the embodiment of the present invention.
Figure 3:
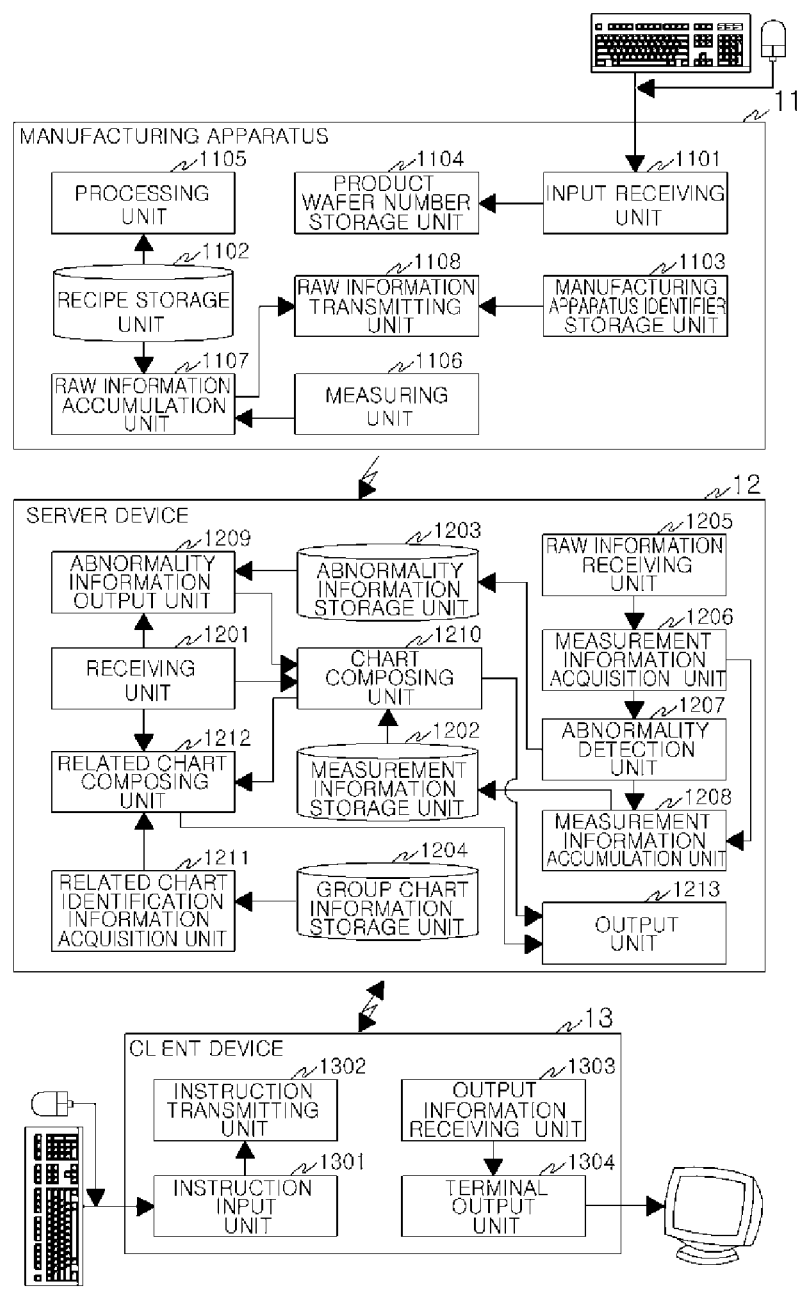
FIG. 3 presents a block diagram of the group management system in accordance with the embodiment of the present invention.
Figure 4:
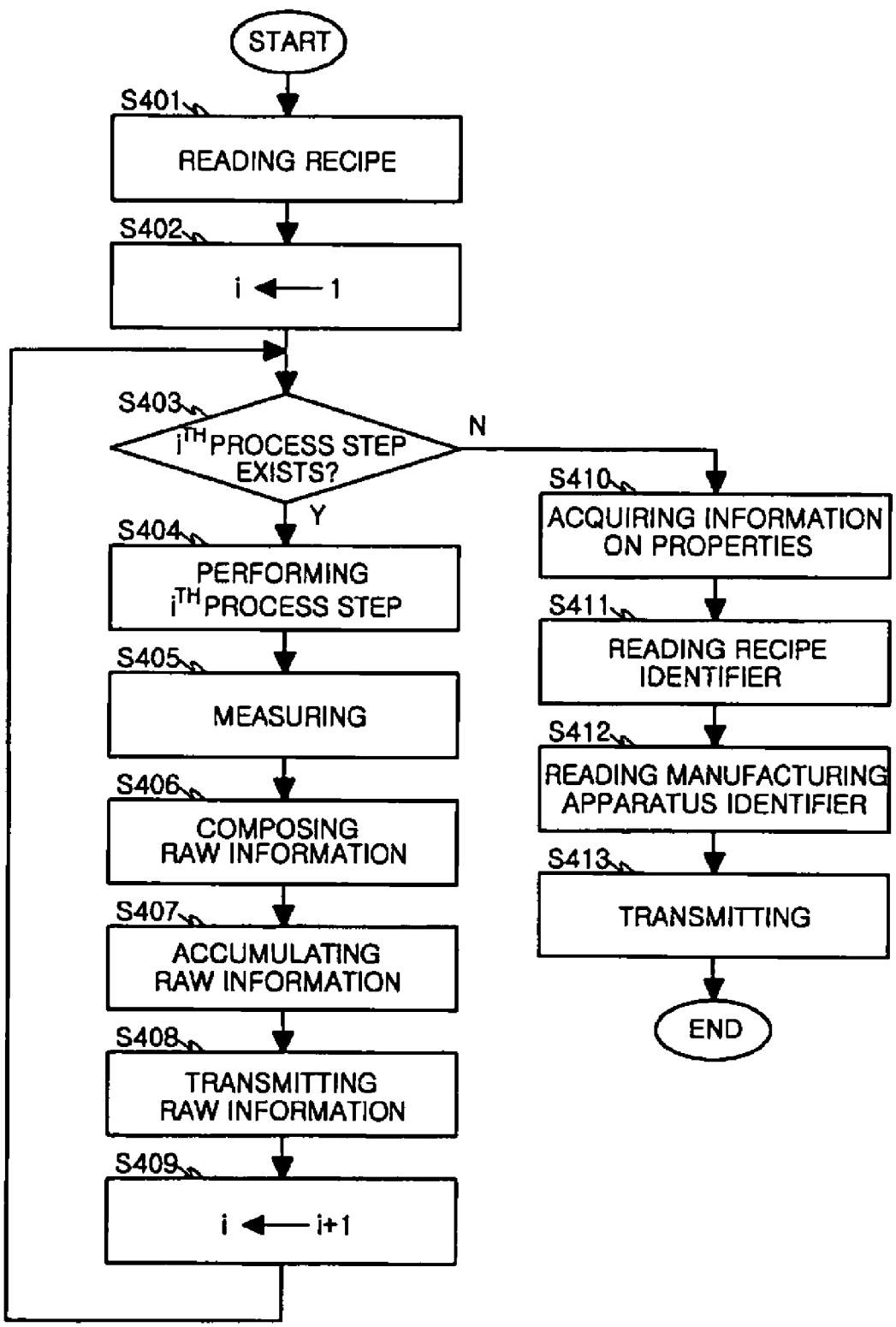
FIG. 4 presents a flowchart showing the operation of a manufacturing apparatus in accordance with the embodiment of the present invention.
Figure 5:
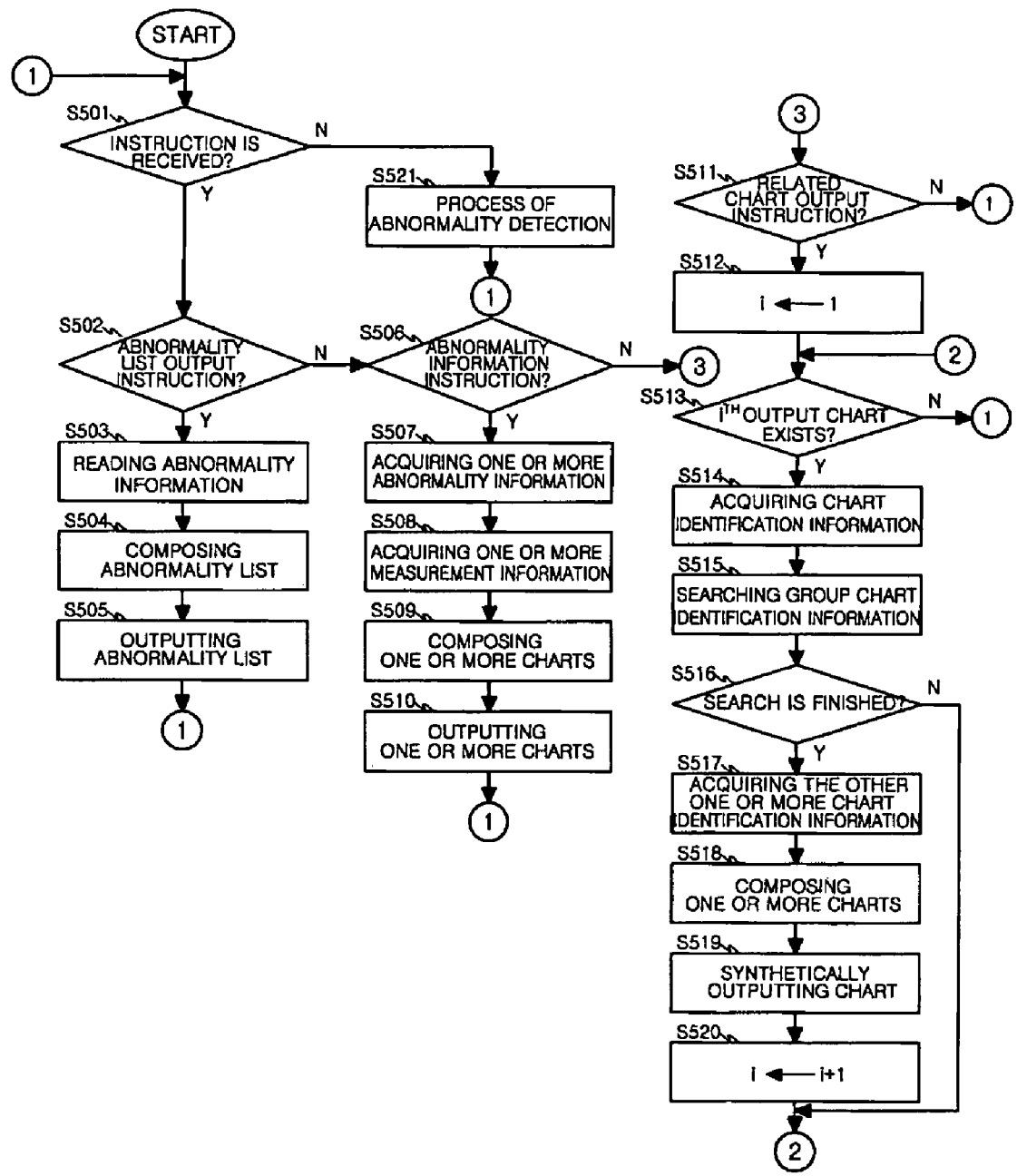
FIG. 5 presents a flowchart showing the operation of a server device in accordance with the embodiment of the present invention.
Figure 6:
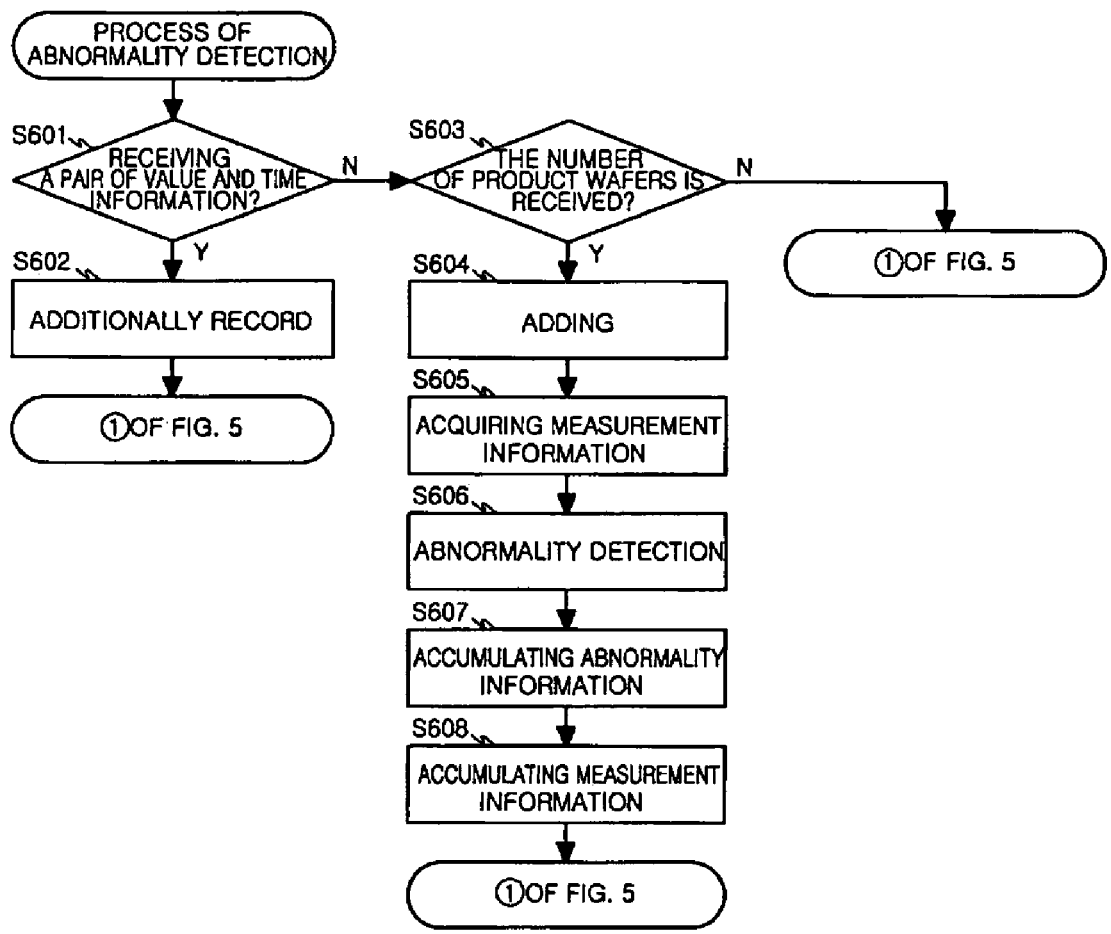
FIG. 6 presents a flowchart showing the detail of the abnormality information detecting process in the server device in accordance of the embodiment of the present invention.
Figure 7:
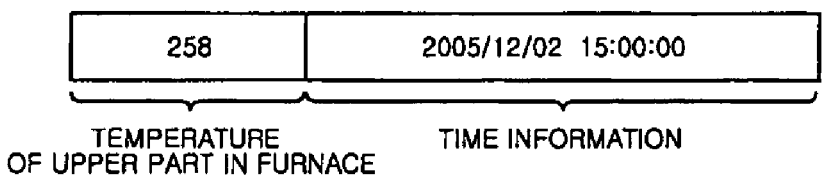
FIG. 7 provides an example of raw information in accordance with the embodiment of the present invention.
Figure 12:
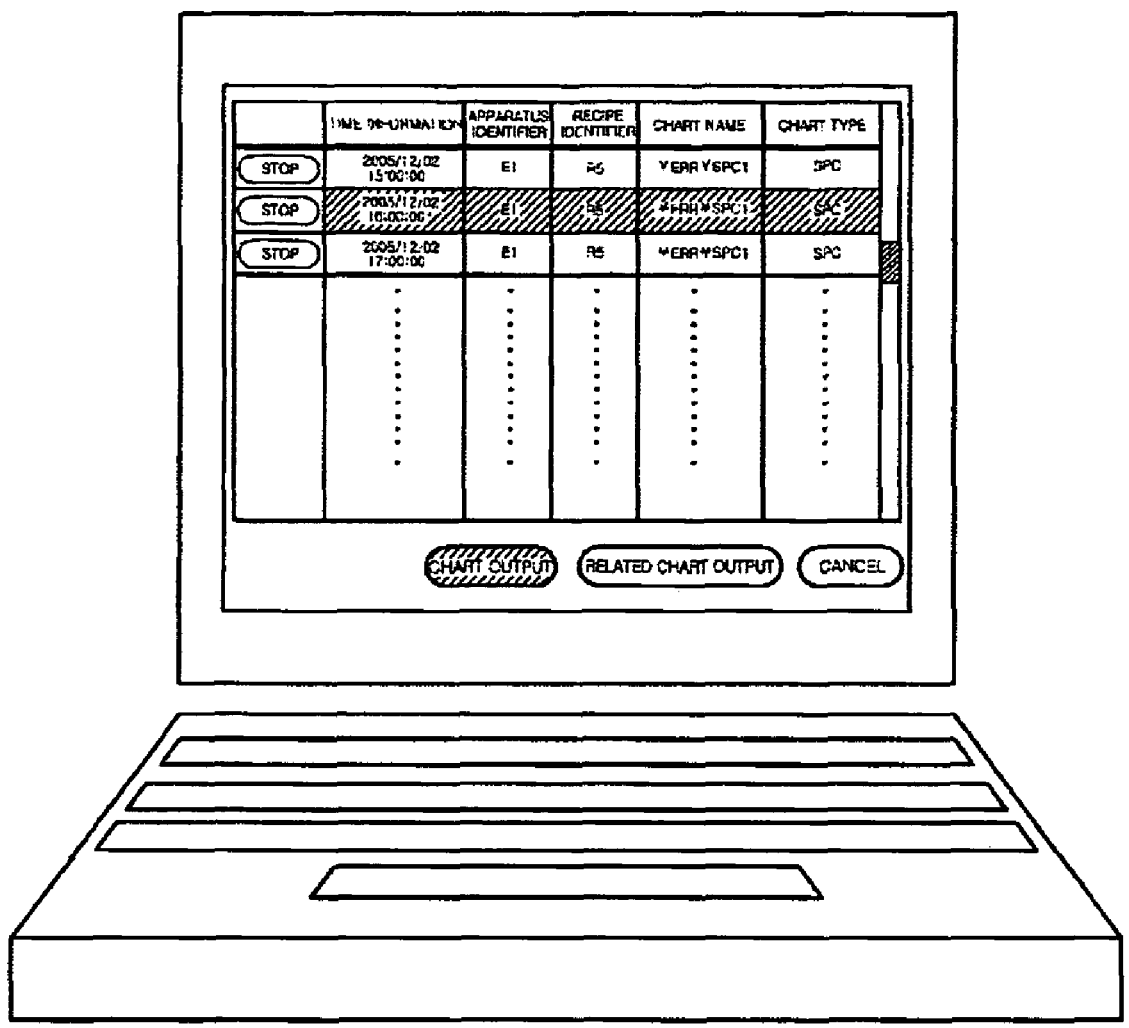
FIG. 12 shows an abnormality list in accordance with the embodiment of the present invention.
Figure 14:
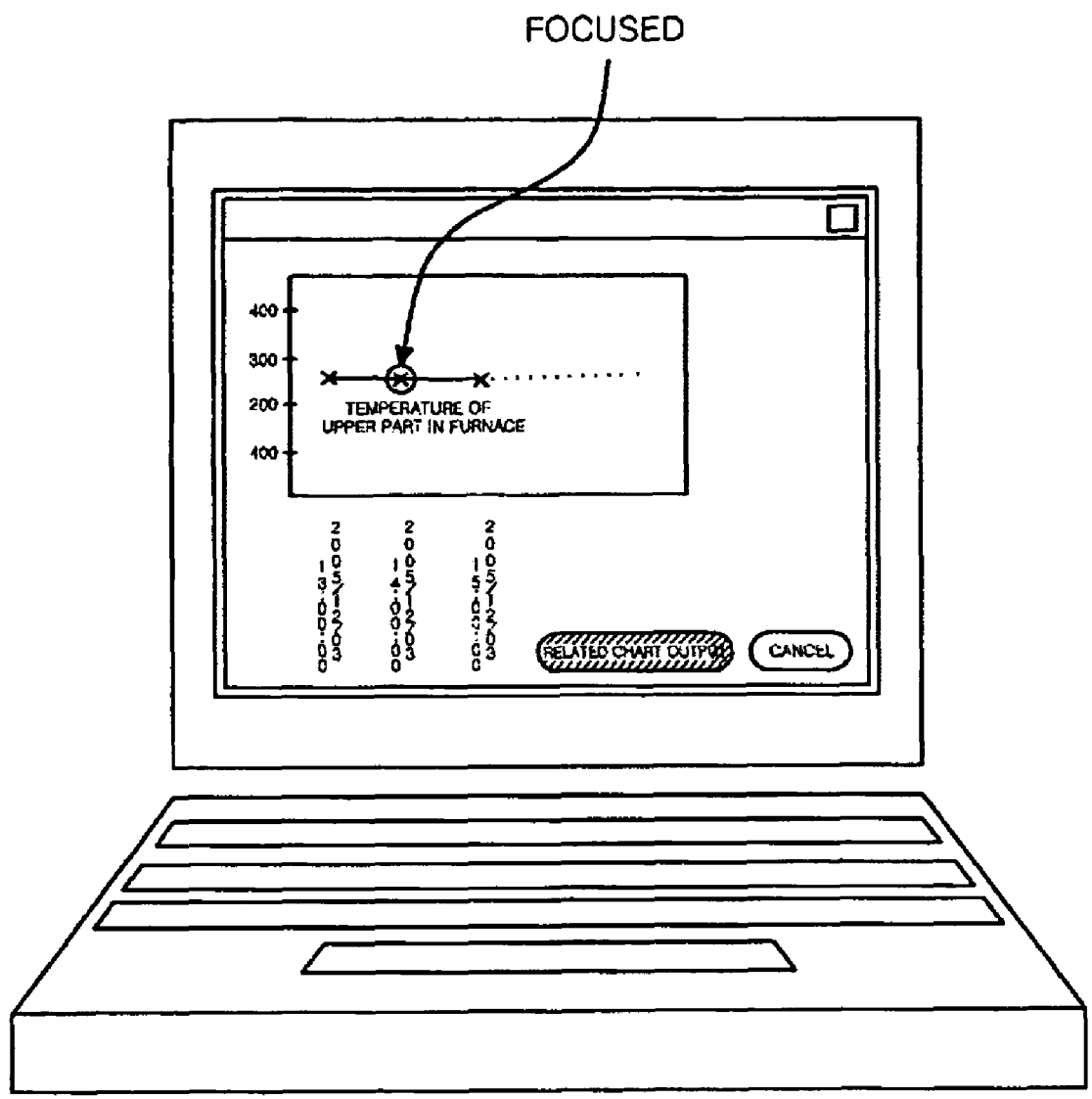
FIG. 14 provides an output example of a chart on a client device in accordance with the embodiment of the present invention.
Figure 15:
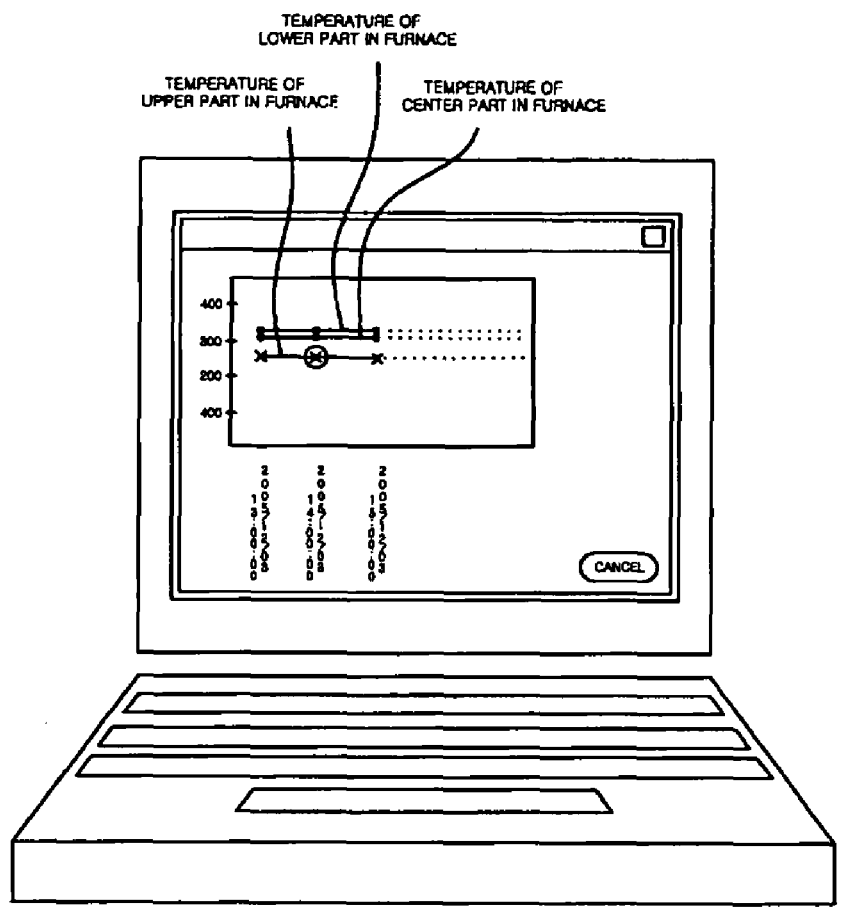
FIG. 15 provides an output example of a chart on the client device in accordance with the embodiment of the present invention.
Figure 16:
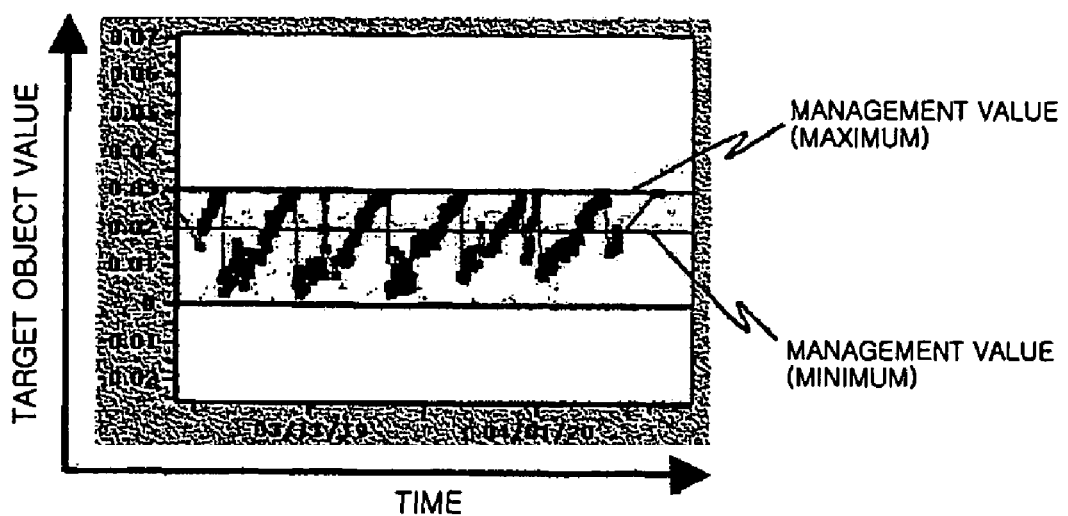
FIG. 16 provides an output example of a chart on the client device in accordance with the embodiment of the present invention.
Figure 17:
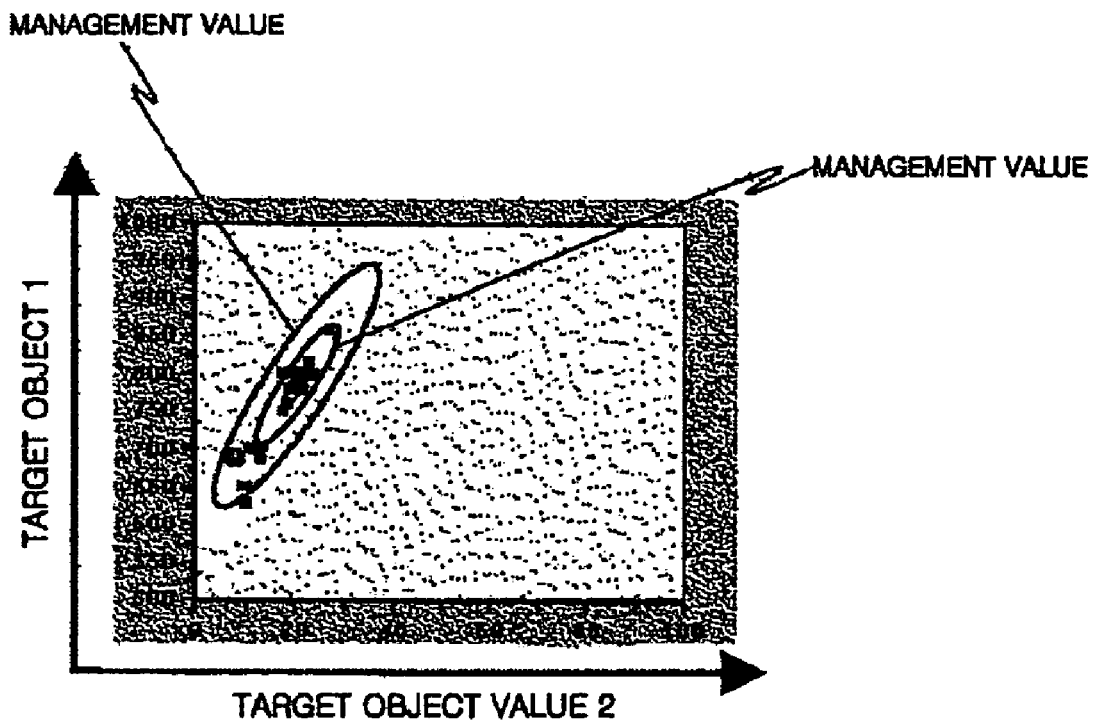
FIG. 17 provides an output example of a chart on the client device in accordance with the embodiment of the present invention.
Figure 18:
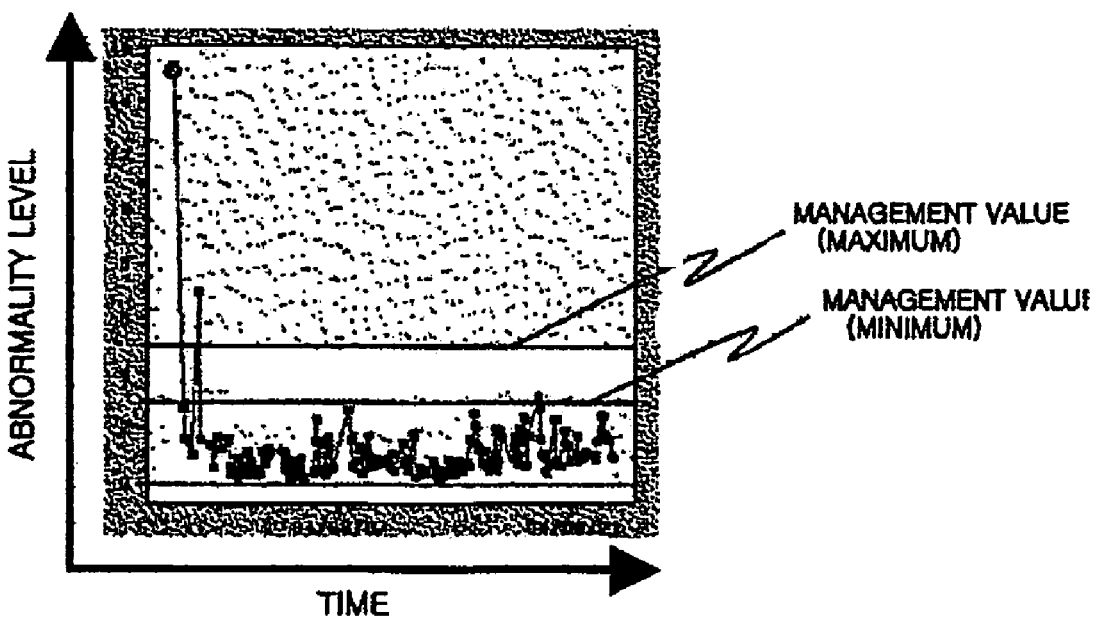
FIG. 18 provides an output example of a chart on the client device in accordance with the embodiment of the present invention.

What is claimed is:

1. A server device constituting a group management system, which includes a plurality of manufacturing apparatuses for performing a preset process on a target substrate, the server device being connected with the plurality of manufacturing apparatuses and having a function of performing an abnormality analysis after detecting an abnormality, the server device comprising:

a receiving unit for receiving an input including an instruction;

a measurement information storage unit for storing therein a plurality of measurement information, which is time sequential information measured in the plurality of manufacturing apparatuses, having manufacturing apparatus identifiers for identifying the manufacturing apparatuses and time information indicating time;

an abnormality information storage unit for storing therein at least one set of abnormality information indicating an abnormality and one or more measurement information;

an abnormality information output unit for outputting one or more abnormality information stored in the abnormality information storage unit;

a chart composing unit for composing one or more charts from one or more measurement information in pair with one or more abnormality information corresponding to an abnormality information instruction when the receiving unit receives the abnormality information instruction, which is an instruction for one or more abnormality information among the one or more abnormality information outputted by the abnormality information output unit;

an output unit for outputting the one or more charts composed by the chart composing unit;

a group chart information storage unit for storing therein one or more group chart information including more than one chart identification information for identifying a chart;

a related chart identification information acquisition unit, when the receiving unit receives a related chart output instruction for outputting a chart related to the outputted one or more charts after the one or more charts are outputted, for acquiring chart identification information for identifying the outputted one or more charts, and for searching group chart information containing the acquired chart identification information from the group chart information storage unit and for acquiring, from group chart information including all chart identification information or any one chart identification information among one or more chart identification information for identifying the outputted one or more charts, one or more chart identification information except the one or more chart identification information for identifying the outputted one or more chart; and a related chart composing unit for composing one or more charts by acquiring one or more measurement information from the measurement information storage unit for each of the one or more chart identification information acquired by the related chart identification information acquisition unit, wherein the output unit also outputs the one or more charts composed by the related chart composing unit.

2. The server device of claim 1, wherein the chart composing unit composes a chart in which the one or more measurement information in pair with the abnormality information corresponding to the abnormality information instruction is visually distinguished from the other measurement information.

3. The server device of claim 1, wherein the chart composing unit composes an SPC chart plotting the one or more measurement information.

4. The server device of claim 1, wherein the related chart composing unit composes an SPC chart plotting the one or more measurement information.

5. The server device of claim 1, wherein the one or more measurement information contains two kinds of measurement values, and
the chart composing unit composes a correlation chart showing a correlation between the two kinds of the measurement values.

6. The server device of claim 1, wherein the one or more measurement information contains two kinds of measurement values, and
the related chart composing unit composes a correlation chart showing a correlation between the two kinds of measurement values.

7. The server device of claim 1, wherein the one or more measurement information contains more than two kinds of measurement values, and
the chart composing unit composes an MD chart showing a correlation between the more than two kinds of measurement values.

8. The server device of claim 1, wherein the one or more measurement information contains more than two kinds of measurement values, and the related chart composing unit composes an MD chart showing a correlation between the more than two kinds of measurement values.

9. A non-transitory storage medium having stored thereon a program to be executed in a server device constituting a group management system, which includes a plurality of manufacturing apparatuses for performing a preset process on a target substrate, the server device being connected with the plurality of manufacturing apparatuses and having a function of performing an abnormality analysis after detecting an abnormality, wherein the program stores therein a plurality of measurement information, which is time sequential information measured in the plurality of manufacturing apparatuses, having manufacturing apparatus identifiers for identifying the manufacturing apparatuses and time information indicating time, and at least one set of abnormality information indicating an abnormality and one or more measurement information, and the program executes on a computer:

a receiving step for receiving an input including an instruction;

an abnormality information output step for outputting the stored one or more abnormality information;

a chart composing step for composing one or more charts from one or more measurement information in pair with one or more abnormality information corresponding to an abnormality information instruction when the abnormality information instruction is received in the receiving step, the abnormality information instruction being an instruction for one or more abnormality information among the one or more abnormality information outputted in the abnormality information output step;

an output step for outputting the one or more chart composed in the chart composing step;

a related chart identification information acquiring step for acquiring chart identification information for identifying the outputted one or more charts, and for searching group chart information containing the acquired chart identification information and for acquiring, from group chart information including all chart identification information or any one chart identification information among one or more chart identification information for identifying the outputted one or more charts, one or more chart identification information except the one or more chart identification information for identifying the outputted one or more chart, when a related chart output instruction for outputting a chart related to the outputted one or more charts is received in the receiving step after the one or more charts are outputted; and a related chart composing step for composing one or more charts by acquiring one or more measurement information for each of the one or more chart identification information acquired in the related chart identification information acquiring step, wherein the one or more charts composed in the related chart composing step is also outputted in the output step.

10. The non-transitory storage medium of claim 9, wherein a chart, in which the one or more measurement information in pair with the abnormality information corresponding to the abnormality information instruction is visually distinguished from the other measurement information, is composed in the chart composing step.

* * * * *

UNITED STATES PATENT AND TRADEMARK OFFICE
CERTIFICATE OF CORRECTION

| | | |
|---|---|---|
| PATENT NO. | : 8,190,283 B2 | |
| APPLICATION NO. | : 12/299530 | |
| DATED | : May 29, 2012 | |
| INVENTOR(S) | : Takumi Inokawa et al. | |

It is certified that error appears in the above-identified patent and that said Letters Patent is hereby corrected as shown below:

In the specification, column 19, line 40, replace "「R5」" with --「SPC」--

In the specification, column 19, line 51, replace "「R5」" with --「SPC」--

Signed and Sealed this
Fourteenth Day of August, 2012

David J. Kappos
*Director of the United States Patent and Trademark Office*